US007021546B2

(12) United States Patent
Watanabe et al.

(10) Patent No.: US 7,021,546 B2
(45) Date of Patent: Apr. 4, 2006

(54) BAR-CODE READER AND METHOD OF READING BAR-CODE

(75) Inventors: Mitsuo Watanabe, Tokyo (JP); Isao Iwaguchi, Tokyo (JP); Hideo Miyazawa, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 24 days.

(21) Appl. No.: 10/707,695

(22) Filed: Jan. 5, 2004

(65) Prior Publication Data

US 2004/0164162 A1  Aug. 26, 2004

(30) Foreign Application Priority Data

Feb. 21, 2003   (JP)   .............................. 2003-045080

(51) Int. Cl.
*G06K 7/10*   (2006.01)
(52) U.S. Cl. .................... 235/462.25; 235/437
(58) Field of Classification Search .......... 235/462.07, 235/462.12, 462.25, 462.29, 437, 462.16, 235/462.27, 462.02, 462.26, 436
See application file for complete search history.

(56) References Cited

U.S. PATENT DOCUMENTS

| | | | | |
|---|---|---|---|---|
| 5,393,968 A | * | 2/1995 | Watanabe et al. | 235/462.29 |
| 5,451,761 A | * | 9/1995 | Kawai et al. | 235/462.07 |
| 5,502,296 A | * | 3/1996 | Kawai et al. | 235/462.07 |
| 5,525,784 A | * | 6/1996 | Kawai et al. | 235/437 |
| 5,525,785 A | * | 6/1996 | Kawai et al. | 235/437 |
| 5,689,103 A | * | 11/1997 | Watanabe et al. | 235/462.12 |
| 5,780,832 A | * | 7/1998 | Watanabe et al. | 235/462.26 |
| 5,854,479 A | * | 12/1998 | Watanabe et al. | 235/462.27 |
| 5,979,765 A | * | 11/1999 | Watanabe et al. | 235/462.27 |
| 6,006,992 A | * | 12/1999 | Watanabe et al. | 235/462.12 |
| 6,032,862 A | * | 3/2000 | Watanabe et al. | 235/462.16 |
| 6,095,419 A | * | 8/2000 | Watanabe et al. | 235/462.02 |
| 6,116,510 A | * | 9/2000 | Nishino | 235/494 |
| 6,206,286 B1 | * | 3/2001 | Watanabe et al. | 235/462.01 |
| 6,321,987 B1 | * | 11/2001 | Watanabe et al. | 235/462.02 |
| 6,357,660 B1 | * | 3/2002 | Watanabe et al. | 235/462.16 |
| 6,547,143 B1 | * | 4/2003 | Koyanagi et al. | 235/462.25 |
| 6,565,004 B1 | * | 5/2003 | Ishii et al. | 235/462.25 |
| 2002/0074407 A1 | * | 6/2002 | Koyanagi et al. | 235/462.16 |

FOREIGN PATENT DOCUMENTS

| | | | |
|---|---|---|---|
| JP | 61251979 A | * | 11/1986 |
| JP | 5-54211 | | 3/1993 |
| JP | 05128292 A | * | 5/1993 |
| JP | 06036065 A | * | 2/1994 |
| JP | 6-342478 | | 12/1994 |
| JP | 7-65105 | | 3/1995 |
| JP | 7-244706 | | 9/1995 |
| JP | 8-329350 | | 12/1996 |
| JP | 9-6885 | | 1/1997 |
| JP | 11-120240 | | 4/1999 |
| JP | 2002133363 A | * | 5/2002 |

* cited by examiner

*Primary Examiner*—Uyen-Chau N. Le
(74) *Attorney, Agent, or Firm*—Armstrong, Kratz, Quintos, Hanson & Brooks, LLP

(57) ABSTRACT

In a bar-code generally number of modules corresponding to each character is seven. However, if the number of modules judged from the data obtained by reading a bar code is, for example, six, the character is demodulated using a demodulation-pattern table corresponding to six modules.

6 Claims, 17 Drawing Sheets

400B — DEDEMODULATION PATTERN TABLE FOR SEVEN MODULES

| | | (1)(2)(3)(4)(5)(6)(7) |
|---|---|---|
| ODD | 0 | B B W B W W W |
| | 1 | B W B B W B W |
| | 2 | B B W W B B W |
| | 3 | B W W B B B W |
| | 4 | B B B W W B W |
| | 5 | B W B W B W W |
| | 6 | B B B B B W W |
| | 7 | B W W W W W W |
| | 8 | B B W B B W W |
| | 9 | B W B B B B W |
| EVEN | 0 | B B W W W B W |
| | 1 | B W B W B B W |
| | 2 | B B W B W B W |
| | 3 | B W W B W W W |
| | 4 | B B B W B W W |
| | 5 | B W B W W B W |
| | 6 | B B B B W B W |
| | 7 | B W W W B B W |
| | 8 | B B W B B B W |
| | 9 | B W B W W W W |

410B — DEDEMODULATION PATTERN TABLE FOR SIX MODULES

| | | (1)(2)(3)(4)(5)(6) |
|---|---|---|
| ODD | 0 | B W B B W W |
| | 1 | DEDEMODULATION IS IMPOSSIBLE (NO PATTERN) |
| | 2 | DEDEMODULATION IS IMPOSSIBLE (NO PATTERN) |
| | 3 | DEDEMODULATION IS IMPOSSIBLE (NO PATTERN) |
| | 4 | B B W W B W |
| | 5 | B W B W B W |
| | 6 | B B W B B W |
| | 7 | B W W B B W |
| | 8 | B B B W B W |
| | 9 | B W B B B W |
| EVEN | 0 | B B W W W W |
| | 1 | DEDEMODULATION IS IMPOSSIBLE (NO PATTERN) |
| | 2 | DEDEMODULATION IS IMPOSSIBLE (NO PATTERN) |
| | 3 | DEDEMODULATION IS IMPOSSIBLE (NO PATTERN) |
| | 4 | B B B W W W |
| | 5 | B W B W W W |
| | 6 | B B B B W W |
| | 7 | DEDEMODULATION IS IMPOSSIBLE (NO PATTERN) |
| | 8 | DEDEMODULATION IS IMPOSSIBLE (NO PATTERN) |
| | 9 | B W B W W W |

420B — DEDEMODULATION PATTERN TABLE FOR EIGHT MODULES

| | | (1)(2)(3)(4)(5)(6)(7)(8) |
|---|---|---|
| ODD | 0 | B W B B W W W W |
| | 1 | B B W W B B W W |
| | 2 | B W B B W B W W |
| | 3 | B B W W W B W W |
| | 4 | B W B B B W W W |
| | 5 | B B W B B W W W |
| | 6 | B W W B B B W W |
| | 7 | B B B W W B W W |
| | 8 | B W B W B B W W |
| | 9 | B B W W B W W W |
| EVEN | 0 | B W B W W B W W |
| | 1 | B B B W B W W W |
| | 2 | B W W W B B W W |
| | 3 | B B B B W B W W |
| | 4 | B W W B W W W W |
| | 5 | B B W B W W W W |
| | 6 | B W B W B W W W |
| | 7 | B B W W W W W W |
| | 8 | B W B B B B W W |
| | 9 | B B B W W W W W |

<CONTINUOUS READING>

<DIVIDED READING>

<BLOCK READING>

FIG.17

| CHARACTERS | NUMBER OF MODULES | | | | | | CHARACTERS | NUMBER OF MODULES | | | | | |
|---|---|---|---|---|---|---|---|---|---|---|---|---|---|
| | a | b | c | d | T1 | T2 | | a | b | c | d | T1 | T2 |
| O-0 | 3 | 2 | 1 | 1 | 3 | 2 | E-0 | 1 | 1 | 2 | 3 | 3 | 5 |
| O-1 | 2 | 2 | 2 | 1 | 4 | 3 | E-1 | 1 | 2 | 2 | 2 | 4 | 4 |
| O-2 | 2 | 1 | 2 | 2 | 3 | 4 | E-2 | 2 | 2 | 1 | 2 | 3 | 3 |
| O-3 | 1 | 4 | 1 | 1 | 5 | 2 | E-3 | 1 | 1 | 4 | 1 | 5 | 5 |
| O-4 | 1 | 1 | 3 | 2 | 4 | 5 | E-4 | 2 | 3 | 1 | 1 | 4 | 2 |
| O-5 | 1 | 2 | 3 | 1 | 5 | 4 | E-5 | 1 | 3 | 2 | 1 | 5 | 3 |
| O-6 | 1 | 1 | 1 | 4 | 2 | 5 | E-6 | 4 | 1 | 1 | 1 | 2 | 2 |
| O-7 | 1 | 3 | 1 | 2 | 4 | 3 | E-7 | 2 | 1 | 3 | 1 | 4 | 4 |
| O-8 | 1 | 2 | 1 | 3 | 3 | 4 | E-8 | 3 | 1 | 2 | 1 | 3 | 3 |
| O-9 | 3 | 1 | 1 | 2 | 2 | 3 | E-9 | 2 | 1 | 1 | 3 | 2 | 4 |

FIG.18

| FLAG CHARACTER | LEFT-SIDE CHARACTER COMPOSITION | | | | | | RIGHT-SIDE CHARACTER COMPOSITION | | | | | | COMPOSITION |
|---|---|---|---|---|---|---|---|---|---|---|---|---|---|
| 0 | O | O | O | O | O | O | E | E | E | E | E | E | UPC/A |
| 1 | O | O | E | O | E | E | E | E | E | E | E | E | EAN13 |
| 2 | O | O | E | E | O | E | E | E | E | E | E | E | |
| 3 | O | O | E | E | E | O | E | E | E | E | E | E | |
| 4 | O | E | O | O | E | E | E | E | E | E | E | E | |
| 5 | O | E | E | O | O | E | E | E | E | E | E | E | |
| 6 | O | E | E | E | O | O | E | E | E | E | E | E | |
| 7 | O | E | O | E | O | E | E | E | E | E | E | E | |
| 8 | O | E | O | E | E | O | E | E | E | E | E | E | |
| 9 | O | E | E | O | E | O | E | E | E | E | E | E | |

BAR-CODE READER AND METHOD OF READING BAR-CODE

BACKGROUND OF THE INVENTION

1) Field of the Invention

The present invention relates to a bar-code reader that reads a bar code optically, and a method of reading the bar code.

2) Description of the Related Art

So far, in distribution of products, POS (Point Of Sales) systems have been used. The POS systems are used to acquire information like product name, product price, date of expiry etc. from a host unit based on bar-code information attached to a product that is read optically by a bar-code reader (bar-code scanner).

FIG. 13 is a block diagram of a configuration of a conventional POS system. Bar-code readers 101 to 10n are installed in a shop. These Bar-code readers 101 to 10n optically read a bar code that is attached to a product and transmit bar-code information to a host unit 20.

A bar code includes black bars and white bars that are arranged alternately. The bar code readers 101 to 10n have an arrangement to optically scan the bar code by laser beam. The laser beam is emitted from a laser diode. The information obtained by scanning the bar code is converted to electric signals and widths of the black lines and the white lines in the bar code is determined from those electric signals. The width of the lines (hereinafter, "bar-code information") change with the price, product code, expiry date etc. of the commodity to which the bar code is attached.

A PLU file 30 includes a correspondence between product information and bar-code information. The product information includes product code, product name, price etc. A host unit 20 receives bar-code information from the bar-code readers 101 to 10n and search the PLU file 30 for the product information corresponding to the bar-code information received. The host unit 20 transmits back the product information to the bar-code reader that has transmitted the bar-code information.

The bar codes can be roughly divided into World Product Code (hereinafter, "WPC") and second code of variable length. The WPC include Japan Article Number (hereinafter, "JAN") code, Universal Product Code (hereinafter, "UPC"), European Article Number (hereinafter, "EAN") etc.

A bar-code according JAN system is illustrated in FIG. 14. This bar-code 40 includes a left guard bar LGB, a center bar CB, and a right guard bar RGB. A right data block formed by data characters of six characters is sandwiched between the right guard bar RGB and the center bar CB. A left data block formed by data characters of six characters is sandwiched between the center bar CB and the left guard bar LGB.

The bar-code 40 is called as 13 digit bar-code. Either an even parity character (a character that has even number of modules of two black data (black bars)) or an odd parity character (a character that has odd number of modules of two black data (black bars) is assigned to each character in the left data block. Thus, the bar-code 40 is a bar code in which characters in the thirteenth line are assigned to values corresponding to combinations of the even parity and the odd parity and includes information of 13 lines.

A composition of a 13 digit bar-code will be described in detail by referring to FIG. 15 to FIG. 18. The right guard bar RGB in the 13 digit bar-code includes three bars in the order of black, white, and black, each formed by one module (unit length) respectively. The center bar CB includes five bars in the order of white, black, white, black, and white, each formed by one module respectively. A left guard bar LGB includes three bars in the order of black, white, and black, each formed by one module respectively. As illustrated in FIG. 15, the left data block is formed by data characters of six characters C1 to C6 and the right data block is formed by data characters of six characters C7 to C12.

As illustrated in FIG. 16, each data character C1 to C6 is formed by a combination of four bars, two white bars and two black bars, and correspond to seven modules (each module has a unit length). In other words, one data character is formed by seven modules.

The four bars that form the data character are lined up in each data character (C1 to C6) that form the left data block, in the order of white data (a), black data (b), white data (c), black data (d) from the left guard bar LGB. The right data block has the same structure as that of the left data block.

FIG. 17 is a table of all bar-width (number of modules) patterns that each bar a, b, c, and d of the data character can have and values corresponding to each bar-width pattern. E-, that precedes the values denotes a data character of even parity (a character for which the sum of number of modules of both black data (b, d) is an even number).

Whereas, O-, that precedes the values denotes a data character of odd parity (a character for which the sum of number of modules of both black data (b, d) is an odd number). T1 denotes a bar width (number of modules) in which black data (d) on the side of the center bar CB and adjacent white data (c) in each data character are combined. T2 denotes a bar width (number of modules) in which corresponding white data (c) and black data (b) on the side of the guard bar (RGB or LGB) are combined. Both T1 and T2 are called as δ-distance.

According to the regulations of the WPC code, the right data block is formed by the data characters of the even parity only and the left data block is formed by the data characters of the even parity and the odd parity.

However the combinations of the even parity and the odd parity that the six data characters of the left data block can have are limited to ten patterns 0 to 9 shown in FIG. 18 due to the regulations of the WPC code. A unique value (from 0 to 9), i.e. a flag character is defined for each combination.

Each combination pattern of classification of the even parity or the odd parity (hereinafter, "ODD/EVEN composition") that the six data characters of the left data block can have is compared with each of the combination patterns and is different for characters not less than two.

Moreover, according to the regulations of the WPC code, when 12 characters that are included in the 13 digit bar-code are classified as an odd position character or an even position character one after the other with a character on the extreme right as the odd position character (the flag character is classified as an odd position character), the sum of three times of the total of values of the data characters in the odd position and the total of values of the data characters in the even position is an integral multiple of 10.

Apart from the 13 digit bar-codes, there are 8 digit bar-codes that are used when the printing area of the bar code is smaller. The 8 digit bar code stores data characters that are formed by four characters, in the left data block and stores data characters that are formed by four characters, in the right data block.

Conventional bar-code readers are disclosed in Japanese Patent Application Laid-open Publication No. H05-054211, H08-329350, and H11-120240.

In the conventional bar-code readers employ a composition in which one character data is formed by seven modules (see FIG. 16). However, due to wrinkles on a bar code or error during extraction of a module, sometimes the one character data is recognized as six modules (one module less for seven modules) or eight modules (one module in excess in seven modules). If the modules are not recognized correctly, the character data cannot be demodulated properly so that the accuracy of reading the bar-code is decreases.

SUMMARY OF THE INVENTION

It is an object of the present invention to at least solve the problems in the conventional technology.

A bar-code reader according to one aspect of the present invention includes a judging unit that judges number of modules corresponding to a character from character data read from a bar-code; and a demodulating unit that, if the number of modules judged is different from a predetermined number, demodulates the character by using a demodulation-pattern table corresponding to the number of modules judged.

A method of reading a bar-code according to another aspect of the present invention includes judging number of modules corresponding to a character from character data read from the bar-code; and if the number of modules judged is different from a predetermined number, demodulating the character by using a demodulation-pattern table corresponding to the number of modules judged.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 2 is an illustration of a demodulation pattern table 400A for seven modules, a demodulation pattern table 410A for six modules, and a demodulation pattern table 420A for eight modules;

FIG. 3 is an illustration of a demodulation pattern table 400B for seven modules, a demodulation pattern table 410B for six modules, and a demodulation pattern table 420B for eight modules;

FIG. 17 is a tabular illustration of combinations of demodulation data and bar-width patterns of data characters in a bar code; and FIG. 18 is a tabular illustration of combinations of flag characters and ODD/EVEN (character) of each data character in a bar code.

DETAILED DESCRIPTION

Exemplary embodiments of a bar-code reader and a method of reading a bar-code according to the present invention are described in detail below with reference to the accompanying drawings.

Figure 1:
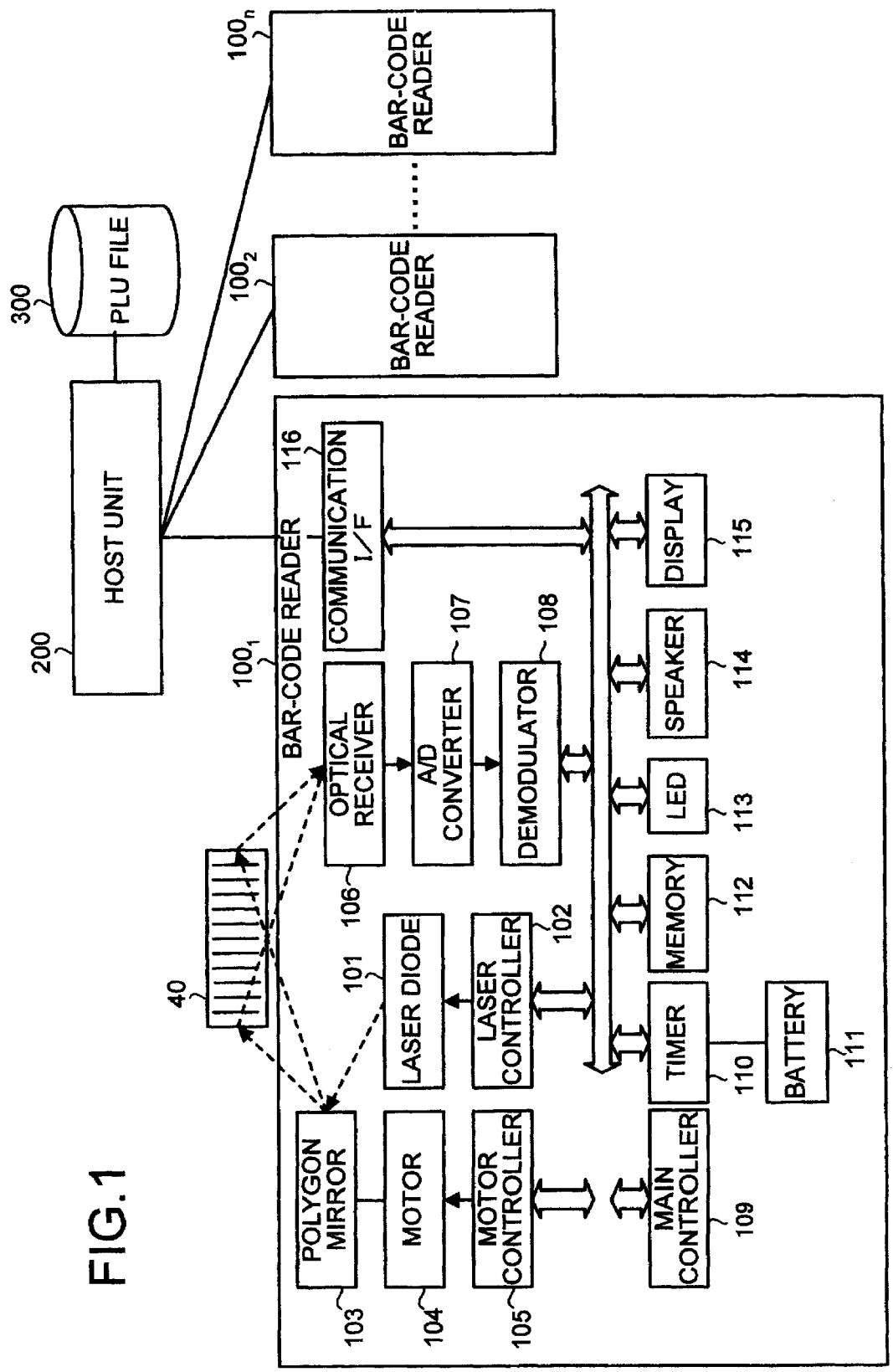
FIG. 1 is a block diagram of a configuration of an embodiment according to the present invention.

FIG. 1 is a block diagram of a POS system that employs a bar-code reader according to an embodiment of the present invention. In this POS system, bar-code readers 1001 to 100*n* are the bar-code readers installed in a shop. The bar-code readers 1001 to 100*n* read a bar code optically that is attached to a product and transmit bar-code information to a host unit 200.

The host unit 200 detects a Price Look Up (hereinafter, "PLU") file 300 that includes product information like product name, price etc. corresponding to a product code recorded in it with the bar-code information that is transmitted one after another from the bar-code reader 1001 to 100*n* after each scanning of a bar code, as a key. The host unit 200 transmits the product information to the bar-code reader that has transmitted the product information.

In the bar-code reader 1001, a laser controller 102 controls a laser diode 101 and the laser diode 101 emits laser beam for scanning. A polygon mirror 103 is a mirror surface that reflects the laser beam that is emitted from laser diode 101. A motor 104 rotates the polygon mirror and changes the direction of reflection of the beam from the polygon mirror 103, thereby giving rise to a plurality of scanning patterns. A motor controller 105 controls the drive of the motor 104.

Figure 14:
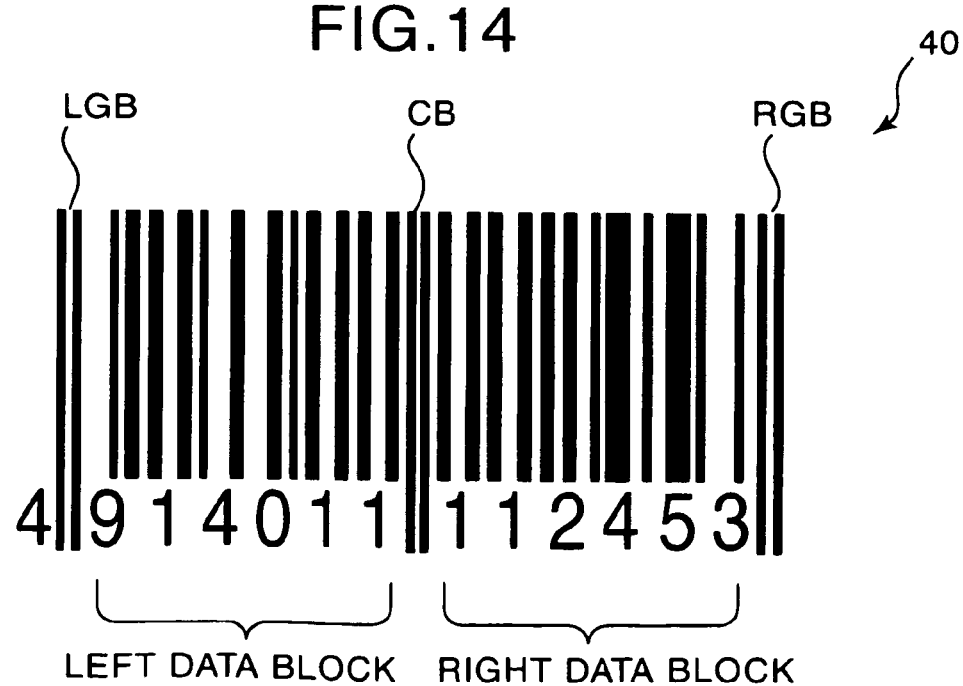
FIG. 14 is an illustration of a bar-code 40.
Figure 15:
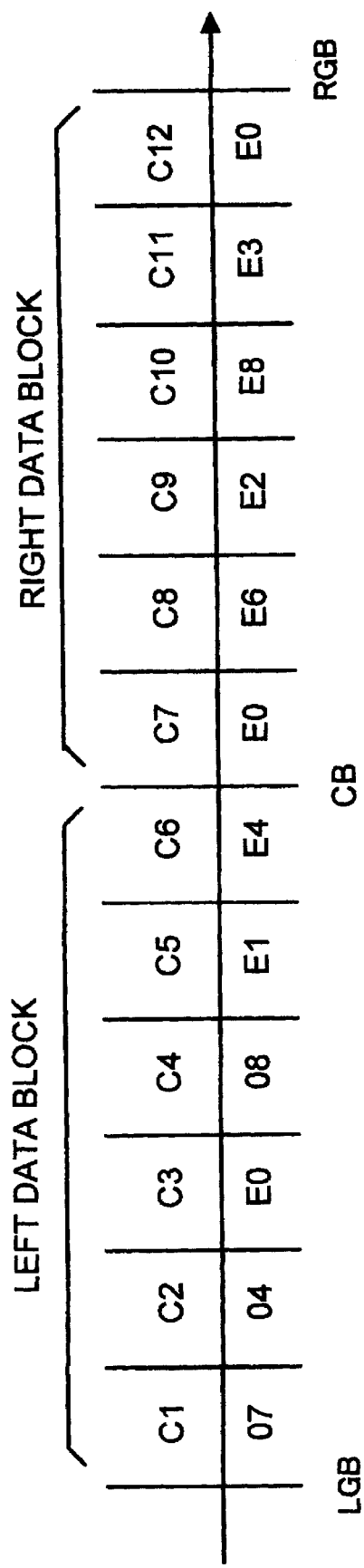
FIG. 15 is an illustration of a data structure in a bar code.
Figure 16:
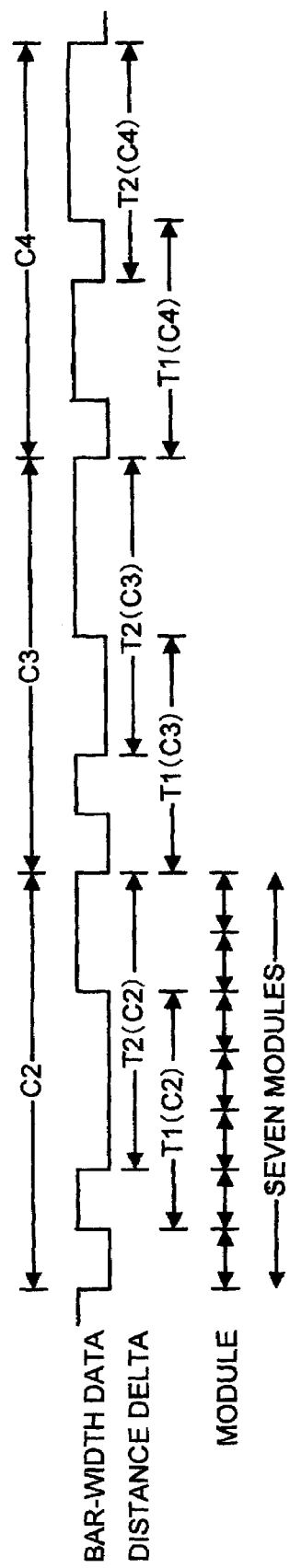
FIG. 16 is an illustration of a character composition in a bar-code.

The laser beam that is reflected from the polygon mirror 103 is irradiated on black data and white data of a bar code 40 (refer to FIG. 14) in a plurality of directions, for example from the left end to the right end, from the right end to the left end of the bar code 40.

An optical receiver 106 receives light that is reflected from the bar code 40 and converts the reflected light opto-electrically to an electric signal of amplitude corresponding to intensity of the reflected light. The optical receiver 106 outputs the opto-electrically converted signal to an A/D converter 107. The A/D (Analog to Digital) converter 107 performs digital sampling of the opto-electrically converted signal (analog signal) from the optical receiver 106 and converts it to a digital reading signal.

A demodulator 108 demodulates a character pattern of the bar code and outputs it as demodulation data bar-code information). In particular, the demodulator 108 has a function that extracts basic frequency equivalent to a unit module of the bar code based on the reading signal from the A/D converter 107 and outputs module judgment data according to a timing point that is synchronized with the reading signal and has the basic frequency.

The demodulator 108 also has a function of recognizing (judging) the number of modules (normally seven modules) of one character from the module judgment data.

Sometimes, due to wrinkles or an error in the bar code, the demodulator 108 recognizes one character wrongly as six modules or eight modules. Taking into consideration such a case, the present embodiment is formed to deal with any one of seven modules, six modules, and eight modules.

Figure 2:
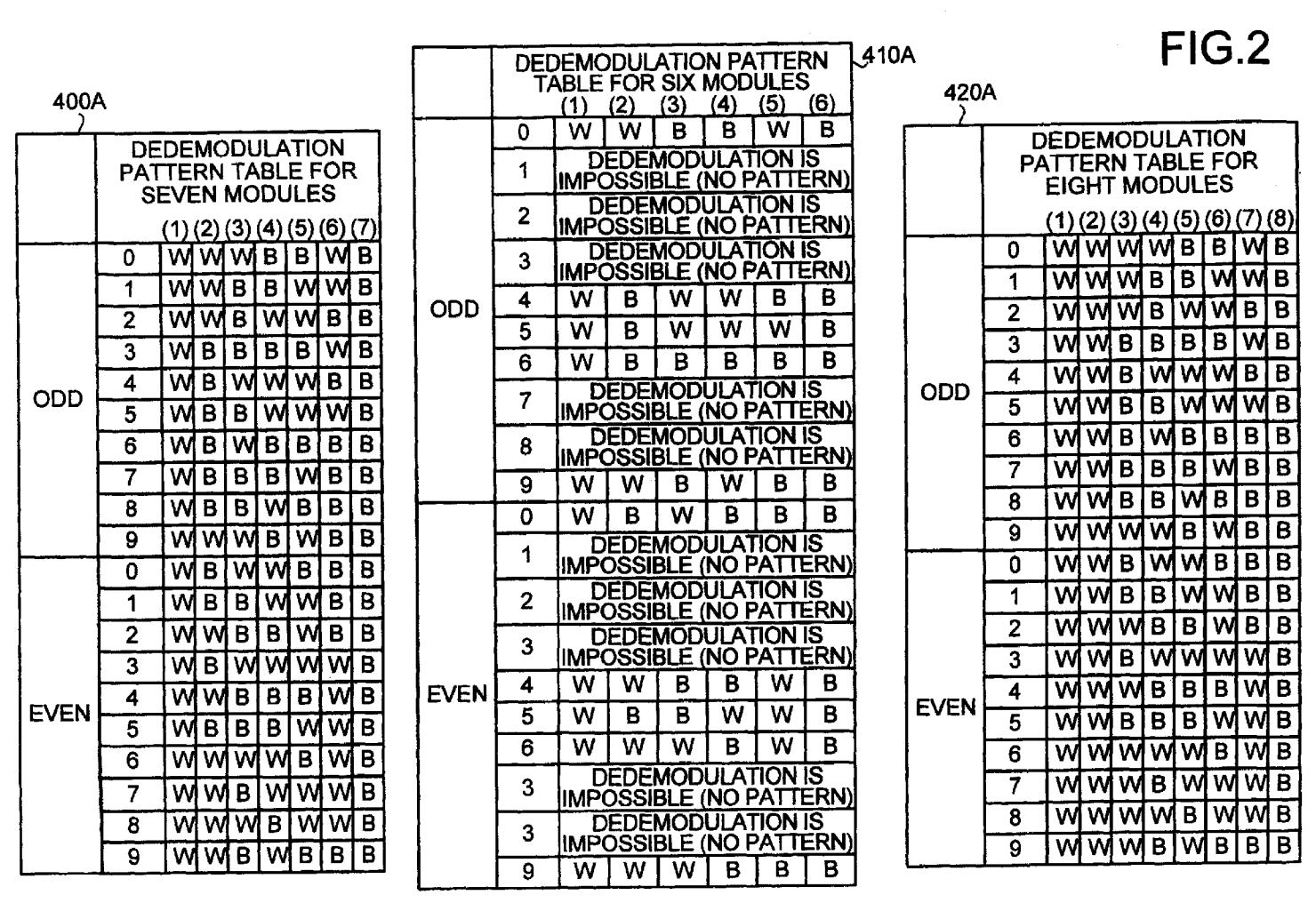

When the demodulator 108 recognizes one character in the reading signal being formed by seven modules, it demodulates the character by using a demodulation pattern table 400A shown in FIG. 2 for seven modules or a demodulation pattern table 400B shown in FIG. 3.

The demodulation pattern table 400A for seven modules is a table that illustrate the relationship of ODD characters 0 to 9 (characters having an odd parity) and EVEN characters 0 to 9 (characters having an even parity) with black and white patterns of each module from modules (1) to (7) corresponding to the reading signal. In FIG. 3, (1) denotes a first module and (2) denotes a second module in the corresponding character and continuing similarly, (7) denotes a seventh module. W denotes white data and B denotes black data.

For example, the ODD character 0 for (1) (the first module) to (7) (the seventh module) corresponds to a demodulation pattern W (white data), W, W, B (black data), B, W, B.

The demodulation pattern table 400A for seven modules is used for a demodulation pattern in which the first module starts with the white data. As illustrated in FIG. 4, one character is normally recognized as a seven modules configuration (1) (first module) to (7) (seventh module). In one character that is shown in this diagram, the first module starts with the white data.

Whereas, the demodulation pattern table 400B for seven modules shown in FIG. 3 is a check table used in a case that is reverse of the demodulation pattern table 400A for seven modules. In the demodulation pattern table 400B for seven modules, an order from the seventh module to the first module is replaced and the composition is made such that it starts from the black data.

In other words, the first module (1) of the demodulation pattern table 400B for seven modules corresponds to the seventh module (7) of the demodulation pattern table 400A for seven modules. Moreover, the second module (2) of the demodulation pattern table 400B for seven modules corresponds to the sixth module (6) of the demodulation pattern table 400A for seven modules. Continuing similarly, the seventh module (7) of the demodulation pattern table 400B for seven modules corresponds to the first module (1) of the demodulation pattern table 400A for seven modules.

The demodulation pattern table 400B for seven modules is used for a demodulation pattern in which the first module starts with the black data. As illustrated in FIG. 4B, one character is normally recognized as a seven-module composition (1) (first module) to (7) (seventh module). In one character that is shown in this diagram, the first module starts with the black data.

Moreover, due to wrinkles and an error in the bar code, when one character is recognized as six modules instead of seven modules, a demodulation pattern table 410A for six modules (refer to FIG. 2) or a demodulation pattern table 410B for six modules (refer to FIG. 3) is used.

The demodulation pattern table 410A for six modules that is shown in FIG. 2 is a check table for six modules. The demodulation pattern table 410A for six modules illustrates the relationship of ODD characters (characters having an odd parity) 0, 4 to 6, and 9, and EVEN characters (characters having an even parity) 0, 4 to 6, and 9 with black and white patterns of each module from the modules (1) to (6) corresponding to the reading signal.

The demodulation pattern table 410A for six modules, as an example, corresponds to a pattern in which a third module (3) in the demodulation pattern table 400A is caused to be less. The demodulation pattern table 410A for six modules (for the demodulation pattern table 410B for six modules, refer to FIG. 3) may be formed as a pattern in which one module apart from the third module is caused to be less.

In the demodulation pattern table 410A for six modules, for ODD characters and EVEN characters 1 to 3, and 7 and 8, candidates of a plurality of characters appear for one pattern (from the first to the sixth modules). Due to this, these ODD characters and EVEN characters are set as demodulation not proper (i.e., no pattern).

In the present embodiment, for the ODD characters and the EVEN characters 1 to 3, and 7 and 8, a plurality of candidates are provided to a user. The characters may be determined by allowing the user to select from the plurality of candidates. In this case, the user support can be provided for bar-code reading.

Whereas, the demodulation pattern table 410B for six modules that is shown in FIG. 3 is a check table for six modules. The demodulation pattern table 410B for six modules illustrates the relationship of ODD characters 0, 4 to 6, and 9, and EVEN characters 0, 4 to 6, and 9 with black and white patterns of each module from modules (1) to (6) corresponding to the reading signal.

The demodulation pattern table 410B, as an example, corresponds to a pattern in which the fifth module (5) in the demodulation pattern table 400B is caused to be less.

In the present embodiment, due to wrinkles and an error in the bar code, when one character is recognized as eight modules instead of seven modules, a demodulation pattern table 420A for eight modules (refer to FIG. 2) or a demodulation pattern table 420B for eight modules (refer to FIG. 3) is used.

The demodulation pattern table 420A for eight modules that is shown in FIG. 2 is a check table for eight modules. The demodulation pattern table 420A for eight modules illustrates the relationship of ODD characters 0 to 9 and EVEN characters 0 to 9 with black and white patterns of each module from the modules (1) to (8) corresponding to the reading signal.

The demodulation pattern table 420A for eight modules, as an example, corresponds to a pattern in which one excessive module is added between the first module (1) and the second module (2) of the demodulation pattern table 400A for seven modules. The demodulation pattern table 420A for eight modules (for the demodulation pattern table 420B for eight modules, refer to FIG. 3) may be formed as a pattern in which one module is added in other position.

Whereas, the demodulation pattern table 420B for eight modules shown in FIG. 3, is also a check table for eight modules. The demodulation pattern table 420B for eight modules illustrates the relationship of ODD characters 0 to 9 and EVEN characters 0 to 9 with black and white patterns of each module from the modules (1) to (8) corresponding to the reading signal.

The demodulation pattern table 420B for eight modules, as an example, corresponds to a pattern in which one excessive module is added between the sixth module (6) and the seventh module (7) of the demodulation pattern table 400B for seven modules.

Referring back to FIG. 1, a main controller 109 controls each section. A timer 110 has a timing function and outputs every moment, information of existing date and time. A battery 111 supplies electric power for back up to the timer 110.

A memory 112 stores firmware that is executed at the main controller 119, bar-code information (also called as demodulation data). The memory 112, in addition, stores the demodulation pattern table 400A for seven modules, the demodulation pattern table 410A for six modules, and the demodulation pattern table 420A for eight modules that are shown in FIG. 2, and the demodulation pattern table 400B for seven modules, the demodulation pattern table 410B for six modules, and the demodulation pattern table 420B for eight modules that are shown in FIG. 3.

A light emitting diode (LED) 113 is an element that emits light beams of green color, yellow color etc. The main controller 109 lights up the LED 113 upon successful reading of the bar code, sounding of the expiry date alarm, and completion of the date setting of the timer 110.

A speaker 114 is a sound informing unit (an alarm) that is linked with the LED 113. The main controller 109 causes the speaker 114 to sound an alarm when the bar-code upon successful reading of the bar code, sounding of the expiry date alarm, and completion of the date setting of the timer 110.

A display 115 displays information such as product, subtotal, sum total etc. A communication interface 116 controls communication with the host unit 200 according to a predetermined communication protocol. The bar-code readers 100₂ to 100n have configurations identical with the bar-code reader 100₁.

The operation of the present embodiment is described below with reference to flow charts in FIG. 6 to FIG. 12.

Three methods of reading a bar code, viz. continuous reading (refer to FIG. 5A), divided reading (refer to FIG. 5B), and block reading (refer to FIG. 5C) are mentioned below.

Figure 5A:
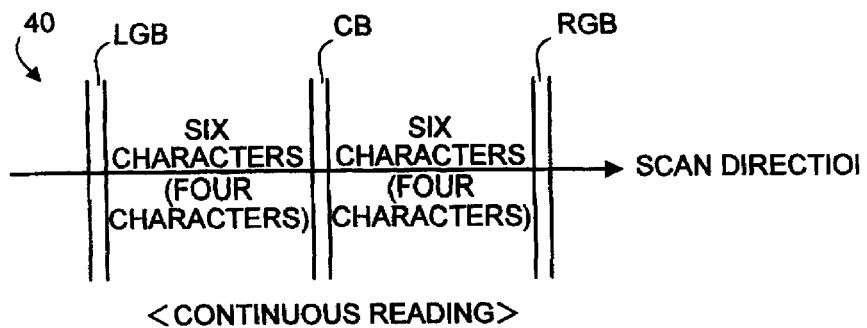
FIGS. 5A, 5B, and 5C are illustrations of type of methods of reading a bar-code according to an embodiment of the present invention.

In the continuous reading, as illustrated in FIG. 5A, when two guard bars (a left guard bar LGB and a right-guard RGB) and a center bar CB are detected by scanning the bar code once, the data characters between all the bars are demodulated.

Figure 5B:
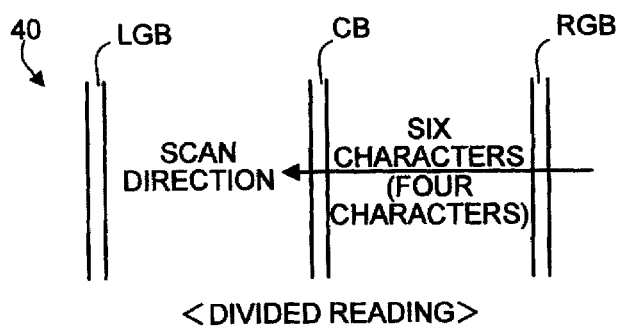

In the divided reading, as illustrated in FIG. 5B, even if it is a data-character string that concatenates a minimum of one guard bar (the right guard bar RGB in FIG. 5B) and the center bar CB, it is recognized as a bar code. Further, the fragments of the demodulated data of the data characters that are read separately are synthesized and the demodulation data corresponding to one whole bar code is reproduced in the divided reading.

Figure 5C:
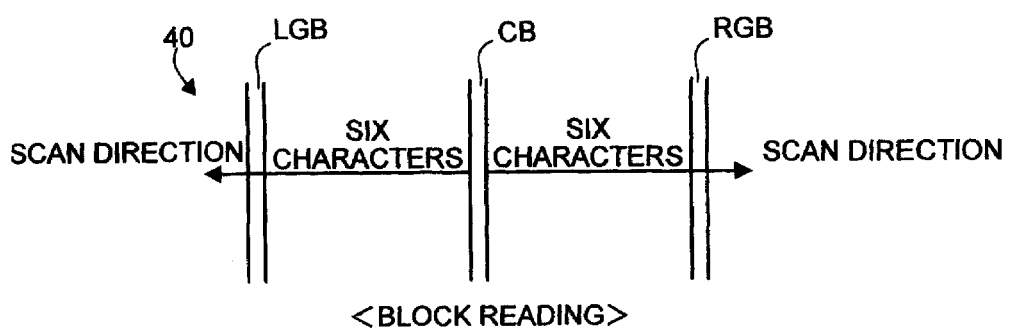

In the block reading, as illustrated in FIG. 5C, only a block of data characters that is enclosed by one of the guard bars and the center bar, is recognized as a bar code. The two blocks are demodulated separately. The demodulation data of the each block is synthesized (combined) and is reproduced as the demodulation data corresponding to one bar code.

To start with, the operation in a case of the continuous reading shown in FIG. 5A is described below. In this case, the bar code 40 is scanned in a scanning direction shown in the diagram (left guard bar LGB→center bar CB→right guard bar RGB).

Figure 6:
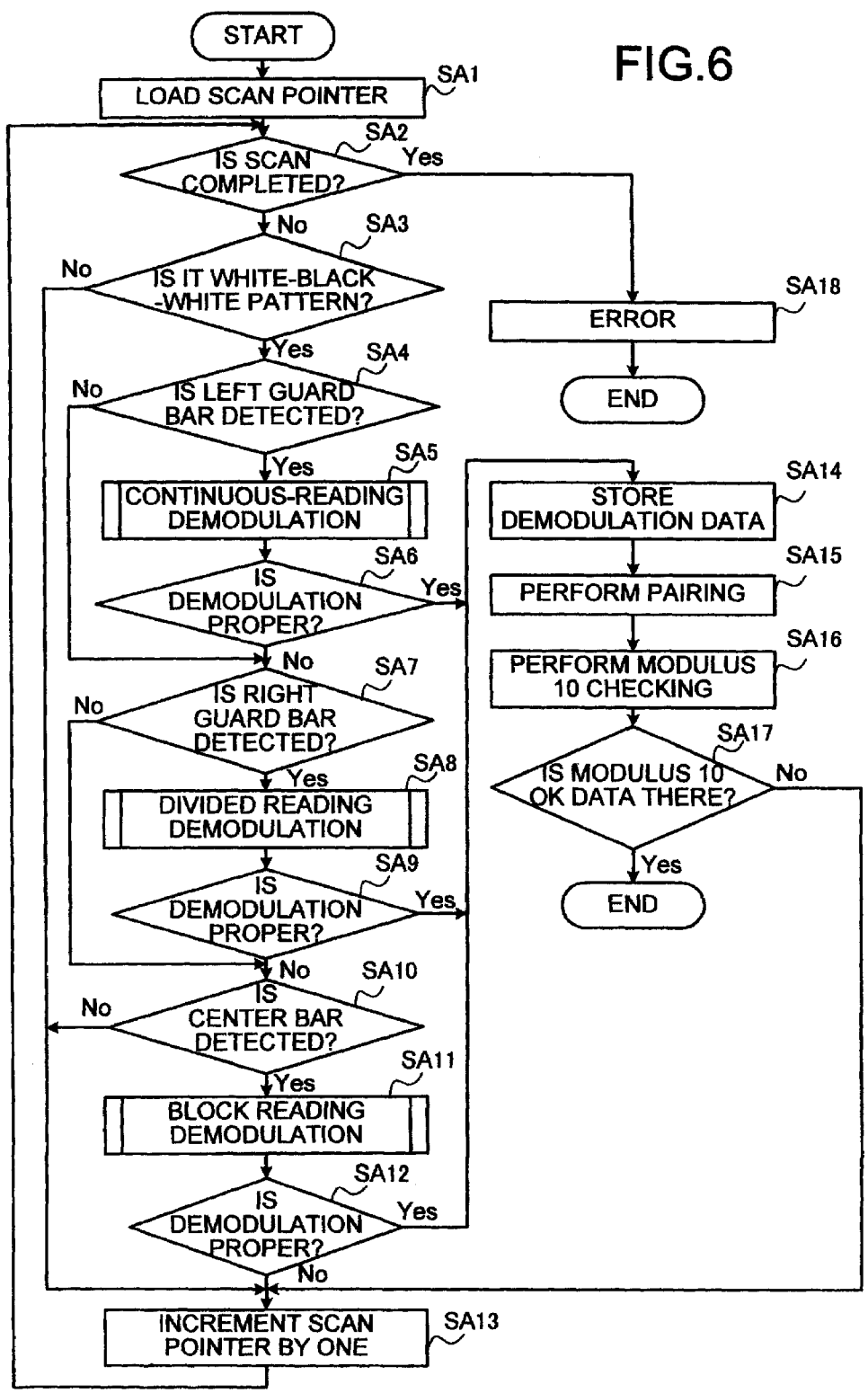
FIG. 6 is a flow chart of an operation according to the present embodiment.

As the scanning of the bar code 40 is started, at step SA1 in FIG. 6, the demodulator 108 loads a scan pointer. At step SA2, the demodulator 108 makes a judgment of whether the scanning is completed or not. In this case, the result of the judgment is No. If the result of the judgment at step SA2 is Yes, the demodulation result is not proper at step SA18.

At step SA3, the demodulator 108 makes a judgment of whether a reading signal from the A/D converter 107 is a white, black, white pattern or not. In this case, if the left end of the left guard bar LGB shown in FIG. 5A is scanned, the demodulator 108 makes the result of the judgment Yes at step SA3.

At step SA4, the demodulator 108 makes a judgment of whether the left guard bar LGB (refer to FIG. 5A) is detected or not. In this case, the result of the judgment is Yes. At step SA5, due to the continuous reading (refer to FIG. 5A), a continuous-reading demodulation to carry out character demodulation is performed based on reading data of characters.

Figure 7:
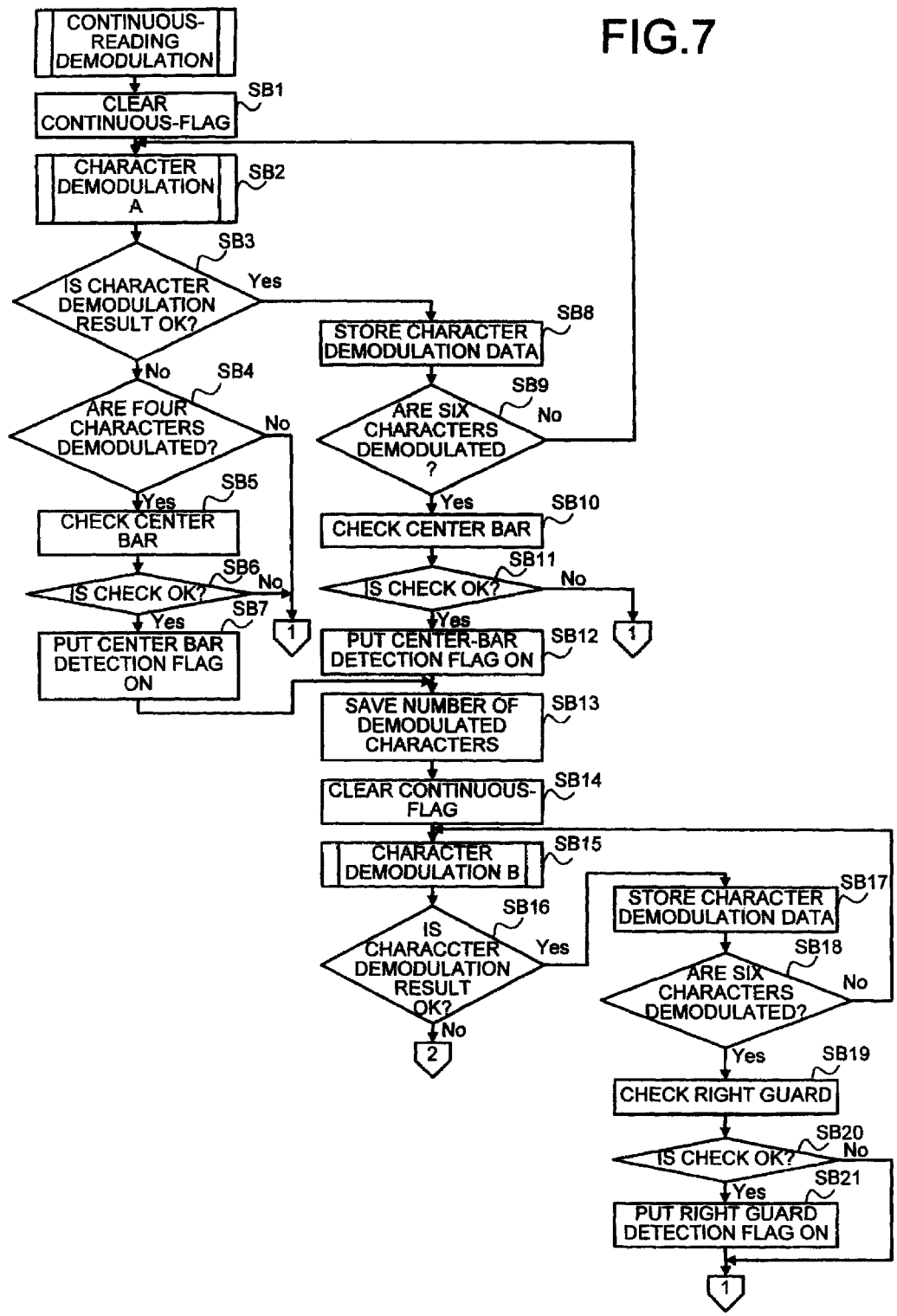
FIG. 7 is a flow chart of continuous-reading demodulation mentioned in FIG. 6.

Concretely, at step SB1 shown in FIG. 7, the demodulator 108 clears a continuous flag. This flag indicates a possibility of continuing characters that are read as six modules or eight modules instead of seven modules. When the continuous flag is ON, the demodulation result of the bar code 40 is not proper.

At step SB2, the demodulator 108 performs character demodulation A to demodulate a first character in a left data block (six characters) between the left guard bar LGB and the center bar CB shown in FIG. 5A.

Figure 4A:
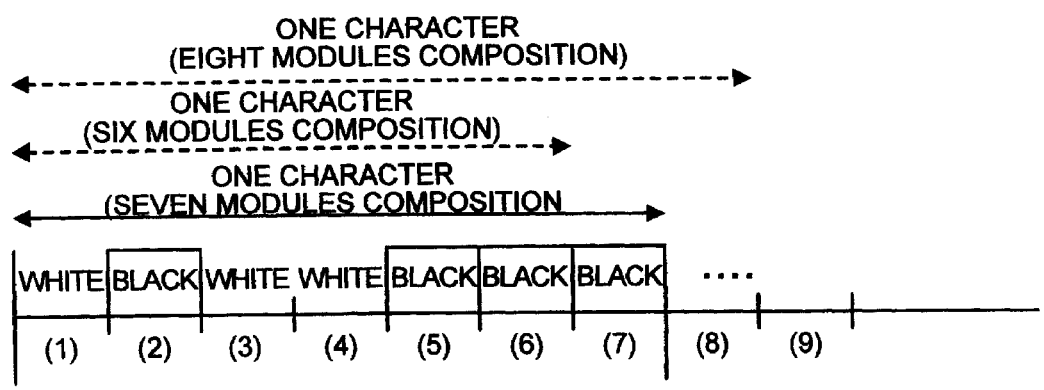
FIGS. 4A and 4B depict a relationship of characters and modules in a bar code.
Figure 4B:
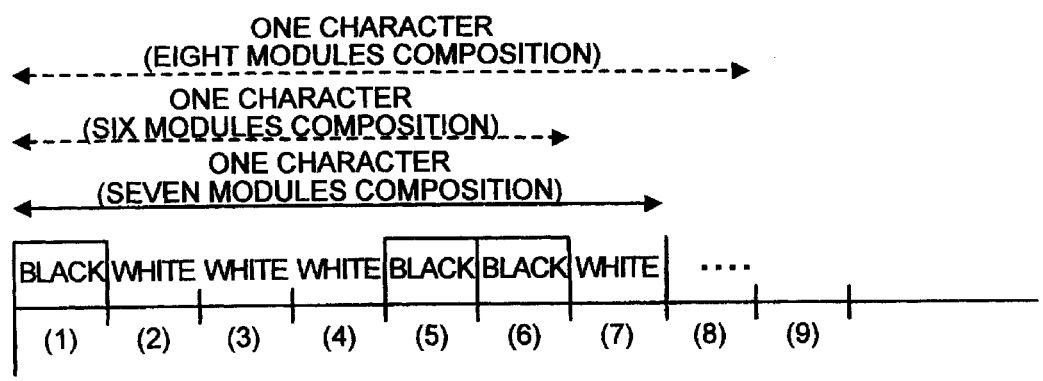
Figure 11:
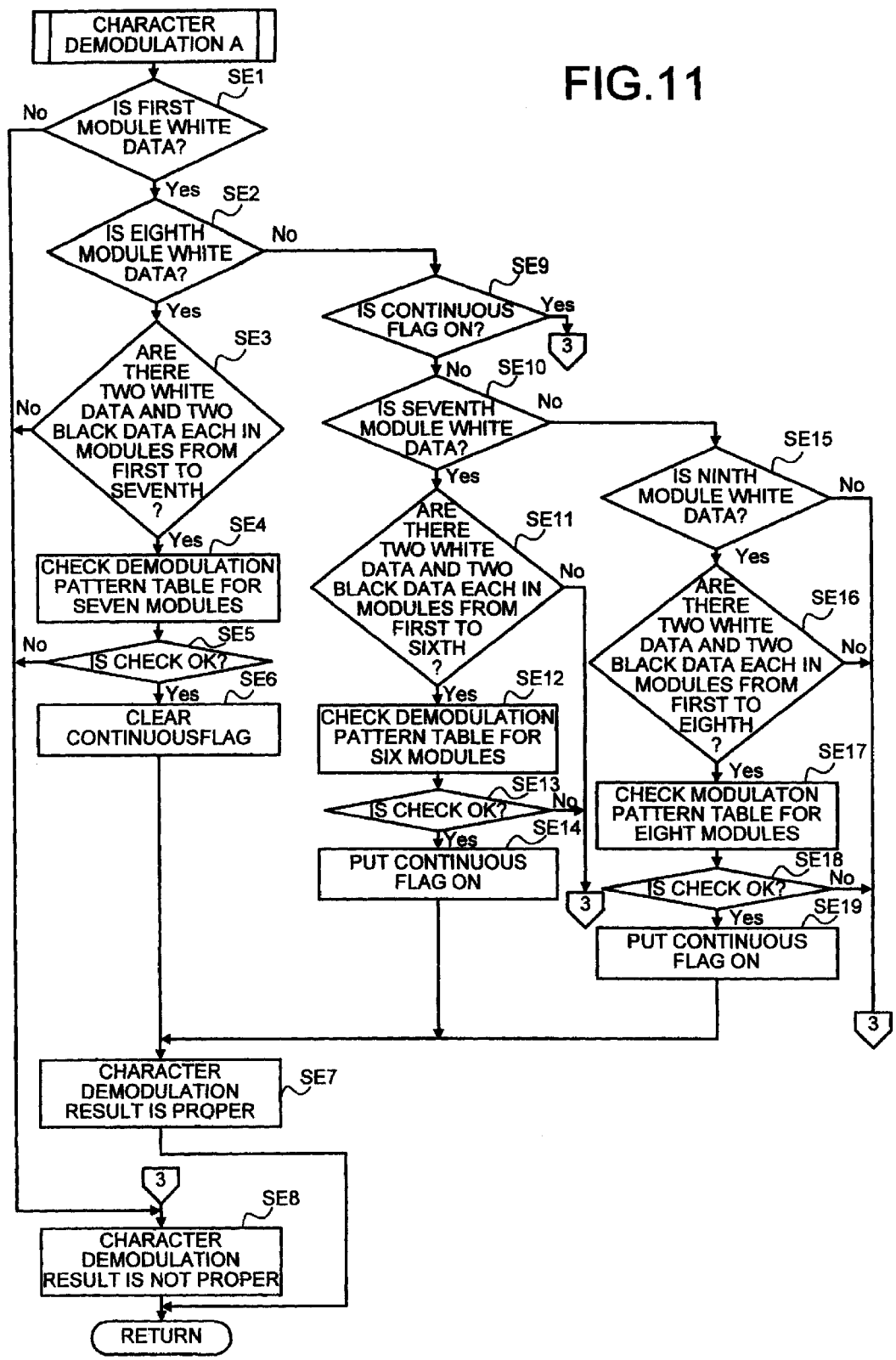
FIG. 11 is a flow chart of a character demodulation A shown in FIG. 7, FIG. 9, and FIG. 10.

Concretely, at step SE1 in FIG. 11, the demodulator 108 makes a judgment of whether the first module ((1) in FIG. 4A) corresponding to the first character in the left data block (refer to FIG. 4A) is white data or not. In this case, the result of the judgment is Yes. If the result of the judgment at step SE1 is No, the demodulator 108 makes the character demodulation result is not proper at step SE8.

At step SE2, the demodulator 108 makes a judgment of whether the eighth module ((8) in FIG. 4A) corresponding to the character is white data or not. In a case of a proper character that is composed of seven modules, the eighth module (in this case, the first module of the subsequent character) is white data.

In this case, the demodulator 108 makes a judgment of Yes at step SE2. At step SE3, the demodulator 108 makes a judgment of whether there are two white data and two black data each in the modules from first to seventh ((1) to (7) in FIG. 4A) in the character (seven-module composition) or not. In this case, the result of the judgment is Yes. If the result of the judgment at step SE3 is No, the character demodulation result is not proper at step SE8.

At step SE4, the demodulator 108, by referring to the demodulation pattern table 400A for seven modules, checks to which character (ODD or EVEN characters from 0 to 9) the pattern of modules from the first module to the seventh module of the character corresponds. The result of this check (any one of ODD or EVEN characters from 0 to 9) indicates character demodulation data.

At step SE5, the demodulator 108, makes a judgment of whether the check result at step SE4 is proper. In this case, the result of the judgment is Yes. If the result of the judgment at step SE5 is No, at step SE8, the demodulator 108 makes the demodulation result of the character to be not proper.

At step SE6, the demodulator 108 clears the continuous flag. At step SE7, the demodulator 108 makes a determination that the demodulation result of the character is proper.

Referring back to FIG. 7, at step SB3, the demodulator 108 makes a judgment of whether the character demodulation result in the character demodulation A for the first character is proper. In this case, the result of the judgment is Yes. At step SB8, the memory 112 stores the character demodulation data based on an instruction from the demodulator 108.

At step SB9, the demodulator 108 makes a judgment of whether six characters in the left data block (between the left guard bar LGB and the center bar CB) of the bar code 40 that is shown in FIG. 5A are demodulated or not. In this case, since only one character is demodulated, the result of the judgment is No.

At step SB2, the character demodulation A for a second character is performed. In other words, at step SE1 shown in FIG. 11, the demodulator 108 makes a judgment of whether the first module ((1) in FIG. 4A) corresponding to a second character of the left data block (refer to FIG. 4A) is white data or not. In this case, the result of the judgment is Yes.

At step SE2, the demodulator 108 makes a judgment of whether the eighth module ((8) in FIG. 4) corresponding to the character is white data or not. Due to an error, the character is sometimes read as a six-module composition (one module less) or an eight-module composition (one module in excess). If the eighth module in this case is black data, the demodulator 108 makes the result of the judgment of step SE2 No.

At step SE9, the demodulator 108 makes a judgment of whether the continuous flag is ON or not. In this case, the result of the judgment is No. If the result of the judgment at step SE9 is Yes, the character demodulation result is not proper at step SE 8.

At step SE10, the demodulator 108 makes a judgment of whether the seventh module in the character is white data or not. In this case, if the character is read as a six-module composition, the demodulator 108 makes the result of the judgment Yes at step SE10.

At step SE11, the demodulator 108 makes a judgment of whether or not there are two white data and two black data each in the modules from the first module to the sixth module ((1) to (6) in FIG. 4A) in the character (in this case, a six-module composition). In this case, the result of the judgment is Yes. If the result of the judgment at step SE11 is No, then step SE8 is executed.

At step SE12, the demodulator 108, by referring to the demodulation pattern table 410A for six modules shown in FIG. 2, checks to which character (ODD or EVEN characters 0, 4 to 6, and 9) the pattern of modules from the first module to the sixth module of the character corresponds. The result of this check (any one of ODD or EVEN characters 0, 4 to 6, and 9) indicates character demodulation data.

At step SE13, the demodulator 108, makes a judgment of whether the check result at step SE12 is proper. In this case, if the pattern of the character (six-module composition) is, for example, W (white), W (white), B (black), B (black), W (white), B (black), the demodulator 108 makes the ODD 0 as the character demodulation data (check result is proper) and the result of the judgment at step SE12 Yes.

If the check result is not proper, i.e. if the pattern of the character doesn't correspond to any of the ODD or EVEN characters 0, 4 to 6, and 9, the demodulator 108 makes the result of the judgment at step SE13 No and the demodulation result of the character at step SE8 as not proper.

At step SE14, the demodulator 108 sets the continuous flag ON. At step SE7, the demodulator 108 makes a determination that the demodulation result of the character is proper.

Referring back to FIG. 7, at step SB3, the demodulator 108 makes a judgment of whether the character demodulation result in the character demodulation A for the second character is proper. In this case, the result of the judgment is Yes. At step SB8, the memory 112 stores the character demodulation data based on an instruction from the demodulator 108.

At step SB9, the demodulator 108 makes a judgment of whether six characters in the left data block (between the left guard bar LGB and the center bar CB) of the bar code 40 that is shown in FIG. 5A are demodulated or not. In this case, since only two characters are demodulated, the result of the judgment is No.

At step SB2, the character demodulation A for the third character is performed in the similar manner and the same operation is repeated.

If the result of the judgment at step SE10 shown in FIG. 11 is No, at step SE15, the demodulator 108 makes a judgment of whether the ninth module in the character is white data or not. In this case, if the character is read as an eight-module composition, the demodulator 108 makes the result of the judgment Yes at step SE15. If the result of the judgment at step SE15 is No, at step SE8 the demodulation result of the character is not proper.

At step S16, the demodulator 108 makes a judgment of whether or not there are two white data and two black data each in the modules from the first module to the eighth module ((1) to (8) in FIG. 4A) in the character (eight-module composition). In this case, the result of the judgment is Yes. If the result of the judgment at step SE16 is No, step SE8 is executed.

At step SE17, the demodulator 108, by referring to the demodulation pattern table 420A for eight modules, checks to which character (ODD or EVEN characters 0 to 9) the pattern of modules from the first module to the eighth module of the character corresponds. The result of this check (any one of ODD or EVEN characters 0 to 9) indicates character demodulation data.

At step SE18, the demodulator 108, makes a judgment of whether the check result at step SE17 is proper. In this case, if the pattern of the character (eight-module composition) is, for example, W (white), W (white), W (white), W (white), B (black), B (black), W (white), B (black), the demodulator 108 makes the ODD 0 as the character demodulation data (check result is proper) and the result of the judgment at step SE18 Yes.

If the check result is not proper, i.e. if the pattern of the character doesn't correspond to any of the ODD or EVEN characters, the demodulator 108 makes the result of the judgment at step SE18 No and the demodulation result of the character at step SE8 as not proper.

At step SE19, the demodulator 108 sets the continuous flag ON. At step SE7, the demodulator 108 makes a determination that the demodulation result of the character is proper.

When the demodulation of six characters in the left data block is completed, the demodulator 108 makes the result of the judgment at step SB9 shown in FIG. 7, Yes. At step SB10, the demodulator 108 checks if the center bar CB in the bar code 40 shown in FIG. 5A is detected.

At step SB11, a judgment of whether the check result at step SB10 is proper (the center bar CB is detected). In this case, the result of the judgment is Yes. If the result of the judgment at step SB11 is No, step SB26 (refer to FIG. 8) is executed.

At step SB12, the demodulator 108 sets a center-bar CB detection flag that indicates detection of the center bar CB (refer to FIG. 5A) ON. At step SB13, data of number of demodulated characters (in this case, for example, six characters) is saved in the memory 112.

At step SB14, the demodulator 108 clears the continuous flag. At step SB15, the demodulator 108 executes character demodulation B to demodulate a first character in a right data block (six characters) between the center bar CB and the right guard bar RGB shown in FIG. 5A.

Figure 12:
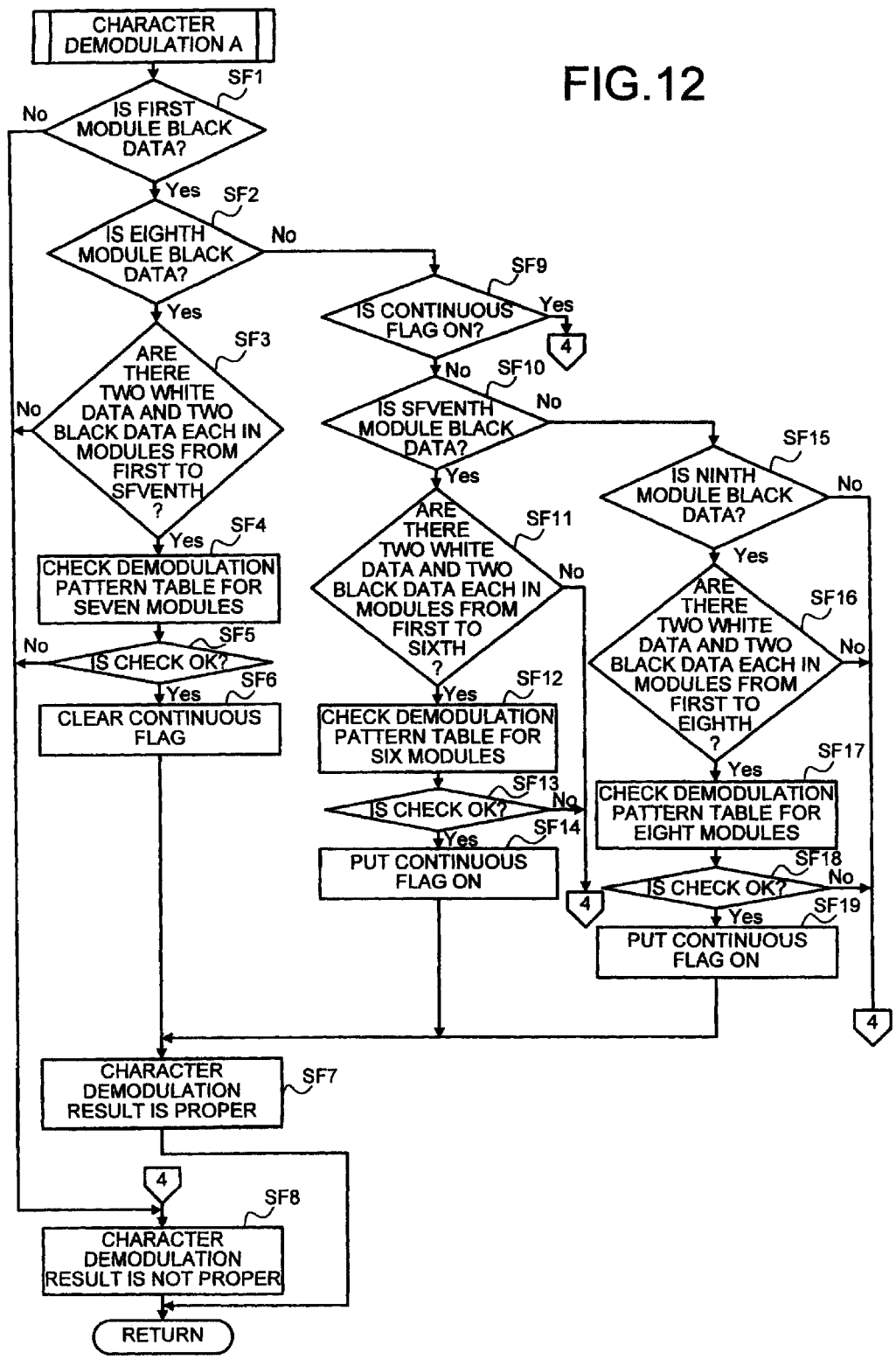
FIG. 12 is a flow chart of a character demodulation B shown in FIG. 7 and FIG. 10.
Figure 13:
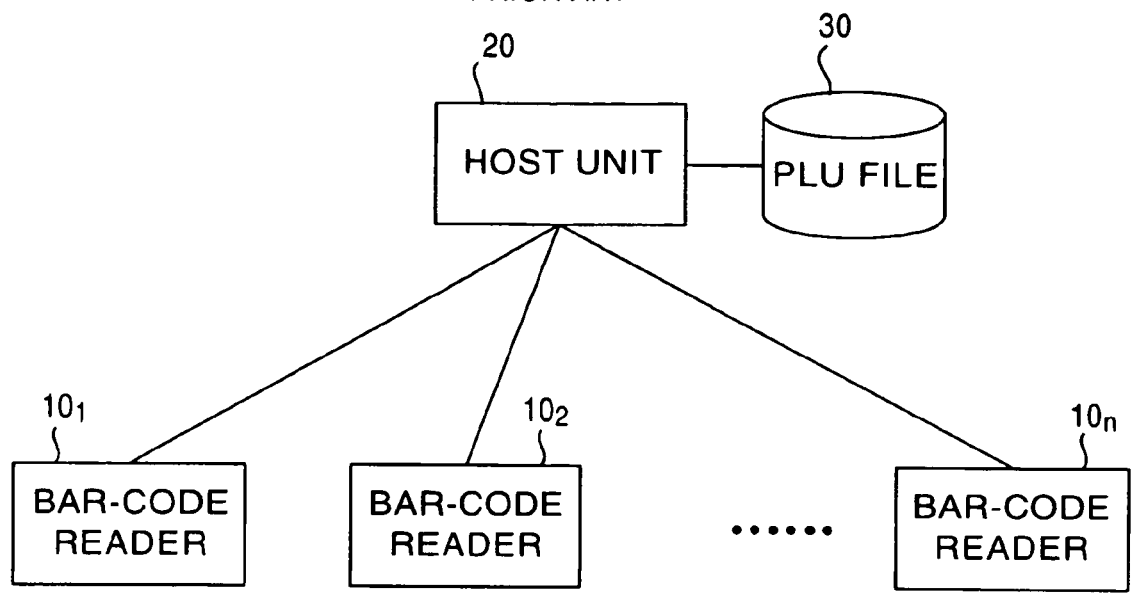
FIG. 13 is a block diagram of a configuration of a conventional POS system.

Concretely, at step SF1 in FIG. 12, the demodulator 108 makes a judgment of whether the first module corresponding to the first character in the right data block RGB is black data or not. In this case, the result of the judgment is Yes. If the result at step SF1 is No, the demodulator 108 makes the character demodulation result as not proper (demodulation impossible) at step SF8.

At step SF2, the demodulator 108 makes a judgment of whether the eighth module corresponding to the character is black data or not. In a case of a proper character that is composed of seven modules, the eighth module (in this case, the first module of the subsequent character) is black data.

In this case, the demodulator 108 makes a judgment of Yes at step SF2. At step SF3, the demodulator 108 makes a judgment of whether there are two white data and two black data each in the modules from first to seventh (seven-module composition) or not. In this case, the result of the judgment is Yes. If the result of the judgment at step SF3 is No, the character demodulation result is not proper at step SF8.

At step SE4, the demodulator 108, by referring to the demodulation pattern table 400B for seven modules, checks to which character (ODD or EVEN characters from 0 to 9) the pattern of modules from the first module to the seventh module of the character corresponds. The result of this check (any one of ODD or EVEN characters from 0 to 9) indicates character demodulation data.

At step SF5, the demodulator 108, makes a judgment of whether the check result at step SF4 is proper. In this case, the result of the judgment is Yes. If the result of the judgment at step SE5 is No, at step SF8, the demodulator 108 makes the demodulation result of the character as not proper.

At step SF6, the demodulator clears the continuous flag. At step SF7, the demodulator 108 makes a determination that the demodulation result of the character is proper.

Referring back to FIG. 7, at step SB16, the demodulator 108 makes a judgment of whether the character demodulation result in the character demodulation B for the first character is proper. In this case, the result of the judgment is Yes. At step SB17, the demodulator 108 stores the character demodulation data in the memory 112.

At step SB18, the demodulator 108 makes a judgment of whether six characters in the right data block (between the center bar CB and the right guard bar RGB) of the bar code that is shown in FIG. 5A are demodulated or not. In this case, since only one character is demodulated, the re-suit of the judgment is No.

At step SB15, the character demodulation B for the second character is performed. In other words, at step SF1 in FIG. 12, the demodulator 108 makes a judgment of whether the first module corresponding to a second character of the right data block is black data or not. In this case, the result of the judgment is Yes.

At step SF2, the demodulator 108 makes a judgment of whether the eighth module corresponding to the character is black data or not. Due to an error, the character is sometimes read as a six-module composition (one module less) or an eight-module composition (one module in excess). If the eighth module in this case is black data, the demodulator 108 makes the result of the judgment of step SF2 No.

At step SF9, the demodulator 108 makes a judgment of whether the continuous flag is ON or not. In this case, the result of the judgment is No. If the result of the judgment at step SF9 is Yes, the character demodulation result is not proper at step SF8.

At step SF10, the demodulator 108 makes a judgment of whether the seventh module in the character is black data or not. In this case, if the character is read as a six-module composition, the demodulator 108 makes the result of the judgment Yes at step SF10.

At step SF11, the demodulator 108, similarly as in step SE11 (refer to FIG. 11) makes a judgment of whether or not there are two white data and two black data each in the modules from the first module to the sixth module ((1) to (6) in FIG. 4B) in the character (six-module composition). In this case, the result of the judgment is Yes. If the result of the judgment at step SF11 is No, then step SF8 is executed.

At step SF12, the demodulator 108, by referring to the demodulation pattern table 410B for six modules shown in FIG. 3, checks to which character (ODD or EVEN characters 0, 4 to 6, and 9) the pattern of modules from the first module to the sixth module of the character corresponds. The result of this check (any one of ODD or EVEN characters 0, 4 to 6, and 9) indicates character demodulation data.

At step SF13, the demodulator 108, makes a judgment of whether the check result at step SF12 is proper. In this case, if the pattern of the character (six-module composition) is, for example, B (black), W (white), B (black), B (black), W (white), W (white), the demodulator 108 makes the ODD 0 as the character demodulation data (check result proper) and the result of the judgment at step SF12 Yes.

If the check result is not proper, i.e. if the pattern of the character doesn't correspond to any of the ODD or EVEN characters 0, 4 to 6, and 9, the demodulator 108 makes the result of the judgment at step SF13 No and the demodulation result of the character at step SF8 as not proper.

At step SF14, the demodulator 108 sets the continuous flag ON. At step SF7, the demodulator 108 makes a determination that the demodulation result of the character is proper.

Referring back to FIG. 7, at step SB16, the demodulator 108 makes a judgment of whether the character demodulation result in the character demodulation B for the second character is proper. In this case, the result of the judgment is Yes. At step SB17, the demodulator 108 stores the character demodulation data in the memory 112.

At step SB18, the demodulator 108 makes a judgment of whether six characters in the right data block (between the center bar CB and the right guard bar RGB) of the bar code 40 that is shown in FIG. 5A are demodulated or not. In this case, since only two characters are demodulated, the result of the judgment is No.

At step SB15, the character demodulation B for the third character is performed in the similar manner and the same operation is repeated.

If the result of the judgment at step SF10 shown in FIG. 12 is No, at step SF15, the demodulator 108 makes a judgment of whether the ninth module in the character is black data or not.

In this case, if the character is read as an eight-module composition, the demodulator 108 makes the result of the judgment Yes at step SF15. If the result of the judgment at step SF15 is No, at step SF8 the demodulation result of the character is not proper.

At step SF16, similarly as at step SE16 (refer to FIG. 11), the demodulator 108 makes a judgment of whether or not there are two white data and two black data each in the modules from the first module to the eighth module ((1) to (8) in FIG. 4B) in the character (eight-module composition). In this case, the result of the judgment is Yes. If the result of the judgment at step SF16 is No, step SF8 is executed.

At step SF17, the demodulator 108, by referring to the demodulation pattern table 420B for eight modules, checks to which character (ODD or even characters 0 to 9) the pattern of modules from the first module to the eighth module of the character corresponds. The result of this check (any one of ODD or EVEN characters 0 to 9) indicates character demodulation data.

At step SF18, the demodulator 108, makes a judgment of whether the check result at step SF17 is proper. In this case, if the pattern of the character (eight-module composition) is, for example, B (black), W (white), B (black), B (black), W (white), W (white), W (white), W (white), the demodulator 108 makes the ODD 0 as the character demodulation data (check result proper) and the result of the judgment at step SF12 is Yes.

If the check result is not proper, i.e. if the pattern of the character doesn't correspond to any of the ODD or EVEN characters, the demodulator 108 makes the result of the judgment at step SF18 No and the demodulation result of the character at step SF8 is not proper.

At step SF19, the demodulator 108 sets the continuous flag ON. At step SF7, the demodulator 108 makes a determination that the demodulation result of the character is proper.

When the demodulation of six characters in the right data block is completed, the demodulator 108 makes the result of the judgment at step SB18 shown in FIG. 7, Yes. At step SB19, the demodulator 108 checks if the right guard bar RGB in the bar code 40 shown in FIG. 5A is detected.

At step SB20, the judgment of whether the check result at step SB19 is proper (i.e., whether the right guard bar RGB is detected). In this case, the result of the judgment is Yes. If the result of the judgment at step SB20 is No, step SB26 (refer to FIG. 8) is executed.

At step SB21, the demodulator 108 sets a right guard bar RGB detection flag that indicates detection of the right guard bar RGB (refer to FIG. 5A), ON.

Figure 8:
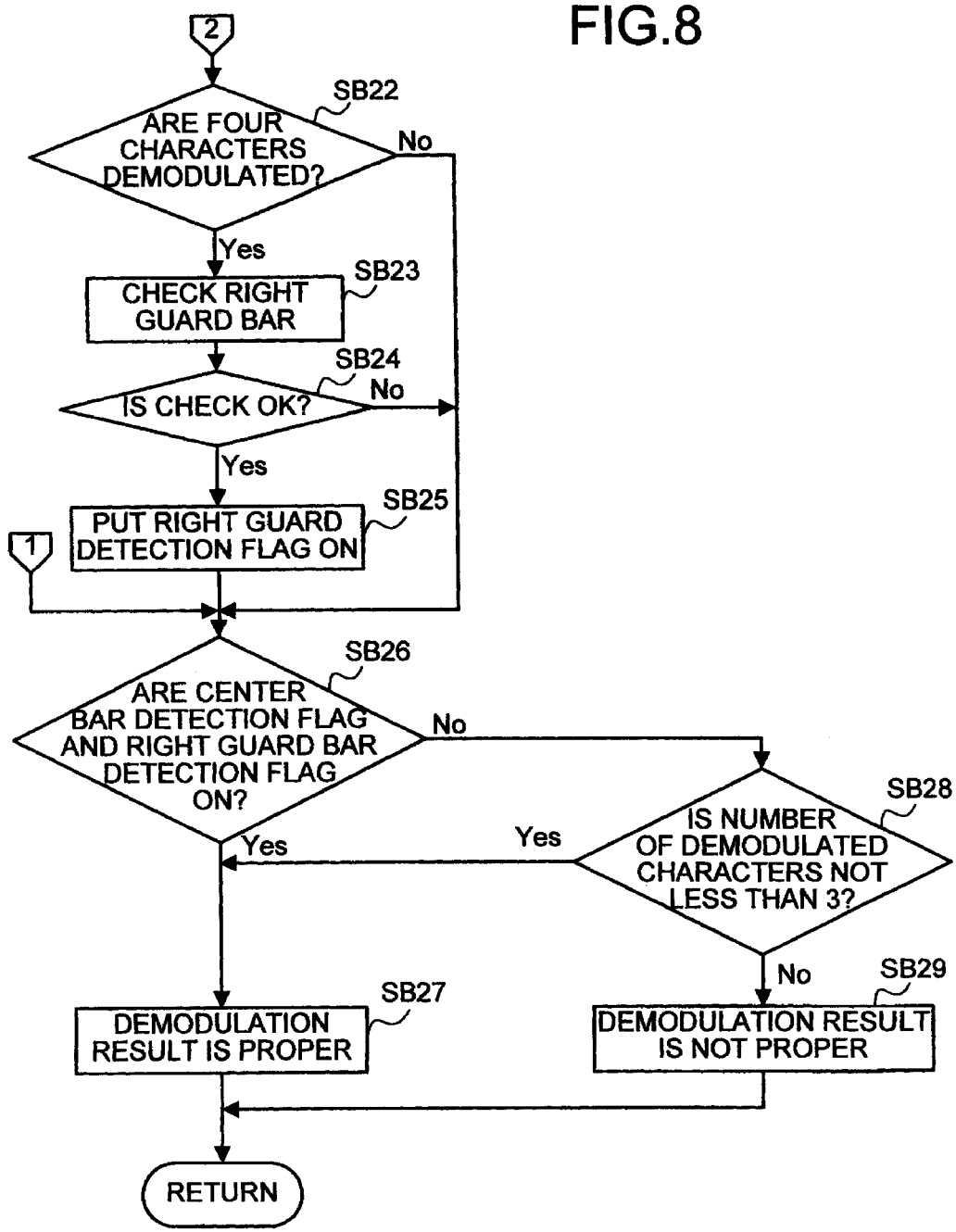
FIG. 8 is a flow chart of continuous-reading demodulation mentioned in FIG. 7.

At step SB26 shown in FIG. 8, the demodulator 108 makes a judgment of whether both of a center-bar detection flag and a right-bar detection flag are ON or not. In this case, the result of the judgment is Yes. At step SB27, the demodulator 108 makes a determination that the demodulation result of the bar code 40 in FIG. 5A is proper.

Referring back to FIG. 6, at step SA6 the demodulator 108 makes a judgment of whether the demodulation was proper (demodulation result OK) in the continuous reading or not. In this case, the result of the judgment is Yes.

At step SA14, the main controller 109 stores the demodulation data for all characters in the memory 112. At step SA15, the demodulator 108 performs pairing of the demodulation data for each block. At step SA16, modulus 10 check of the demodulation data is performed.

Moreover, according to the regulations of the WPC code, when 12 characters that are included in a 13 digit bar-code are classified as an odd position character or an even position character one after another with the character on the extreme right as the odd position character (the flag character is classified as an odd position character), the sum of three times of the total of values of the data characters in the odd position and the total of values of the data characters in the even position is an integral multiple of 10.

If this regulation is used, when the demodulation data that is obtained by the block reading is synthesized, it is easy to check if the demodulation data corresponding to the whole of the bar code is reproduced or not. This check is performed during the modulus 10 check.

At step SA17, the main controller 109 makes a judgment of whether the modulus 10 check result is proper. In the result of the judgment is Yes, a series of processes ends.

If the result of the judgment at step SA17 is No, at step SA13, the demodulator 108 performs 1 increment of scan pointer and then step SA2 is executed.

If the result of the judgment at step SB3 shown in FIG. 7 is No, at step SB4, the demodulator 108 makes a judgment of whether four characters in the left data block (between the left guard bar LGB and the center bar CB) of the bar code 40 shown in FIG. 5A are demodulated or not. If the result of the judgment at step SB4 is No, the judgment at step SB26 (refer to FIG. 8) is made.

If the result of the judgment at step SB4 is Yes, at step SB5, the demodulator 108 checks if the center bar CB of the bar code 40 shown in FIG. 5A is detected.

At step SB6, a judgment of whether the check result at step SB5 is proper (i.e., whether the center bar CB is detected) is made. If the result of the judgment at step SB6 is No, step SB26 (refer to FIG. 8) is executed.

If the result of the judgment at step SB6 is Yes, at step SB7, the demodulator 108 sets the center-bar detection flag ON and steps SB13 onward are executed.

If the result of the judgment at step SB16 shown in FIG. 7 is No, at step SB22 shown in FIG. 8, the demodulator 108 makes a judgment of whether four characters in the left data block (between the left guard bar LGB and the center bar CB) of the bar code 40 shown in FIG. 5A are demodulated or not. If the result of the judgment at step SB22 is No, step SB26 is executed.

Whereas, if the result of the judgment at step SB22 is Yes, at step SB23, the demodulator checks if the right guard bar RGB of the bar code 40 shown in FIG. 5A is detected.

At step SB24, a judgment of whether the check result at step SB23 is proper (i.e., whether the right guard bar RGB is detected) is made. If the result of the judgment at step SB24 is No, step SB26 is executed.

Whereas, if the result of the judgment at step SB24 is Yes, at step SB25, the demodulator sets the right guard bar RGB detection flag ON and step SB26 is executed.

If the result of the judgment at step SB26 is No, at step SB28, the demodulator 108 makes a judgment of whether or not the number of demodulated characters is not less than three. If the result of the judgment is Yes, the demodulation result at step SB27 is proper. If the result of the judgment at step SB28 is No, at step SB29, the demodulation result is not possible.

The operation in a case of the divided reading shown in FIG. 5B is described below. In this case, the bar code 40 is scanned in a scanning direction shown in the diagram (right guard bar RGB→center bar CB).

As the scanning of the bar code 40 is started, at step SA1 in FIG. 6, the demodulator 108 loads the scan pointer. At step SA2, the demodulator 108 makes a judgment of whether the scanning is completed or not. In this case, the result of the judgment is No.

At step SA3, the demodulator 108 makes a judgment of whether a reading signal from the A/D converter is a white, black, white pattern or not. In this case, if the right end of the right guard bar RGB shown in FIG. 5B is scanned, the demodulator 108 makes the result of the judgment at step SA3 Yes.

At step SA4, the demodulator 108 makes a judgment of whether the left guard bar LGB (refer to FIG. 5*b*) is detected or not. In this case, the result of the judgment is No. At step SA7, the demodulator 108 makes a judgment of whether the right guard bar RGB (refer to FIG. 5B) is detected or not. In this case, the result of the judgment is Yes and a right guard bar detection flag is set ON.

At step SA8, due to divided reading (refer to FIG. 5B), a divided-reading demodulation to perform character demodulation is performed based on reading data of characters.

Figure 9:
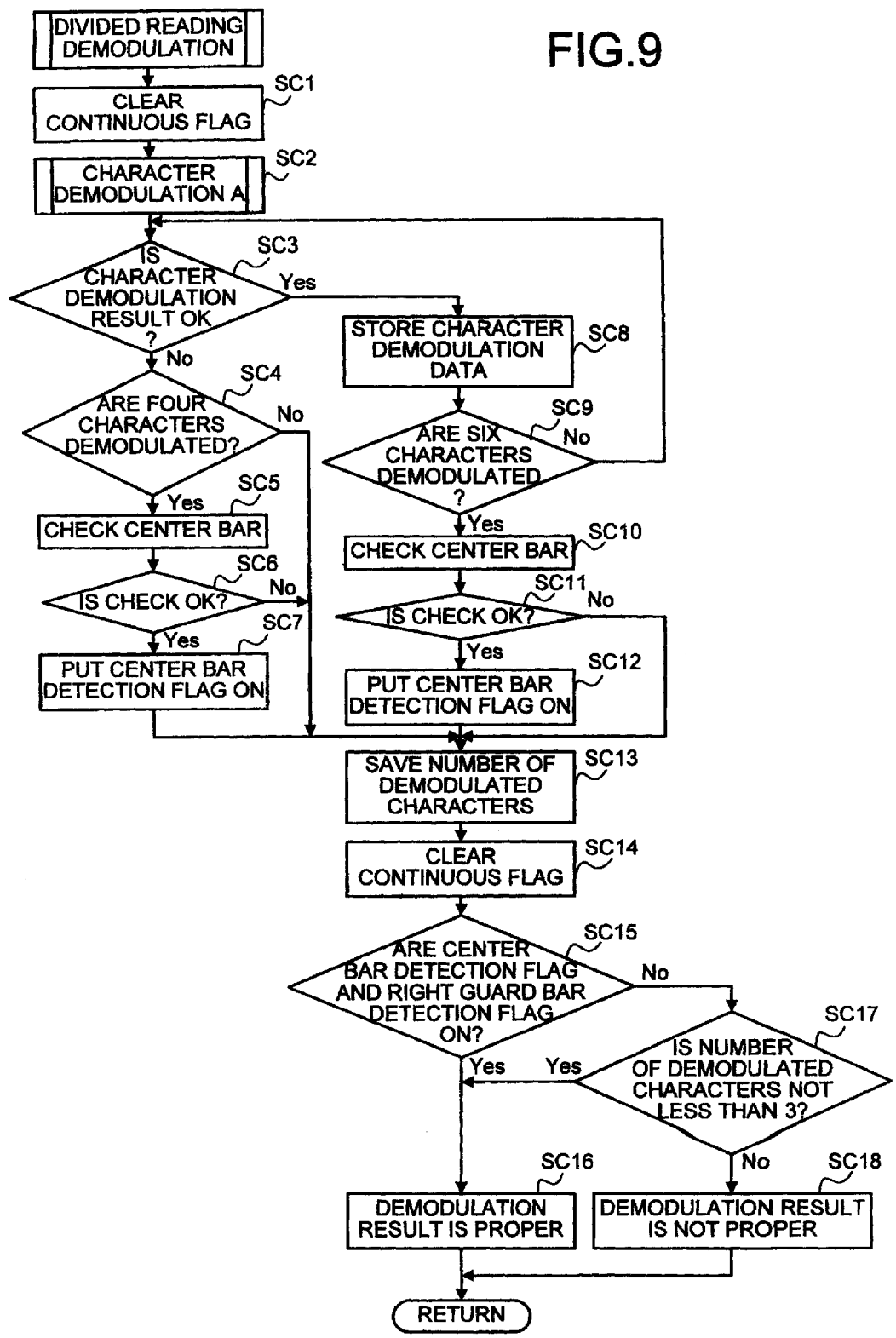
FIG. 9 is a flow chart of divided reading demodulation mentioned in FIG. 6.

Concretely, at step SC1 in FIG. 9, the demodulator 108 clears a continuous flag. At step SC2, the demodulator 108 performs character demodulation A (refer to FIG. 11) to demodulate a first character in the right data block (six characters) between the right guard bar RGB and the center bar CB shown in FIG. 5B.

At step SC3, the demodulator 108 makes a judgment of whether the character demodulation result in the character demodulation A for the first character is proper. In this case, the result of the judgment is Yes. At step SC8, the demodulator 108 stores the character demodulation data in the memory 112.

At step SC9, the demodulator 108 makes a judgment of whether six characters in the right data block (between the right guard bar RGB and the center bar CB) of the bar code 40 shown in FIG. 5B are demodulated or not. In this case, since only one character is demodulated, the result of the judgment is No.

At step SC2, the character demodulation A for the second character is performed.

When the demodulation of six characters in the right data block is completed, the demodulator 108 makes the judgment at step SC9 Yes. At step SC10, the demodulator 108 checks if the center bar CB in the bar code 40 shown in FIG. 5b is detected.

At step SC11, a judgment of whether the check result at step SC10 is proper (i.e., whether center bar CB is detected) is made. In this case, the result of the judgment is Yes. If the result of the judgment at step SC11 is No, step SC13 is executed.

At step SC12, the demodulator 108 sets the center-bar detection flag that indicates detection of the center bar CB (refer to FIG. 5B) ON. At step SC13, the demodulator 108 saves data of number of characters (in this case, six characters) in the memory 112. At step SC14, the demodulator 108 clears the continuous flag.

At step SC15, the demodulator 108 makes a judgment of whether both of the center-bar detection flag and the right-guard detection flag are ON. In this case, the result of the judgment is Yes. At step SC16, the demodulator 108 makes the demodulation result of the bar code 40 in FIG. 5B proper.

Referring back to FIG. 6, at step SA9, the demodulator 108 makes a judgment of whether the demodulation was proper (demodulation result OK) in the divided reading, or not. In this case, the result of the judgment is Yes and steps SA14 onward are executed. If the result of the judgment at step SA9 is No, step SA10 is executed.

If the result of the judgment at step SC3 shown in FIG. 9 is No, at step SC4, the demodulator 108 makes a judgment of whether four characters in the right data block (between the right guard bar RGB and the center bar CB) in the bar code 40 shown in FIG. 5B is demodulated or not. If the result of the judgment at step SC4 is No, step SC13 is executed.

If the result of the judgment at step SC4 is Yes, at step SC5, the demodulator 108 checks if the center bar CB in the bar code 40 shown in FIG. 5B is detected.

At step SC6, the judgment of whether the check result at step SC5 is proper (i.e., whether the center bar CB is detected) is made. If the result of the judgment at step SC6 is No, step SC13 is executed.

If the result of the judgment at step SC6 is Yes, at step SC7, the demodulator 108 sets the center-bar detection flag ON and then steps SC13 onward are executed.

If the result of the judgment at step SC15 is NO, at step SC17, the demodulator 108 makes a judgment of whether or not the number of demodulated characters is not less than three. If the result of the judgment is Yes, at step SC16, the demodulation result is proper. Whereas, if the result of the judgment at step SC17 is No, at step SC18, the demodulation result is not proper.

The operation in a case of the block reading shown in FIG. 5C is described below. In the block reading, the bar code 40 is scanned in a scanning direction shown in the diagram (center bar CB→left guard bar LGB, center bar CB→right guard bar RGB).

As the scanning of the bar code 40 is started, at step SA1 in FIG. 6, the demodulator 108 loads the scan pointer. At step SA2, the demodulator 108 makes a judgment of whether the scanning is completed or not. In this case, the result of the judgment is No.

At step SA3, the demodulator 108 makes a judgment of whether the reading signal from the A/D converter 107 is a white, black, white pattern or not. In this case, if a right end of the center bar CB shown in FIG. 5C is scanned, the demodulator 108 makes the result of the judgment Yes at step SA3.

At step SA4, the demodulator 108 makes a judgment of whether the left guard bar LGB (refer to FIG. 5C) is detected or not. In this case, the result of the judgment is No. At step SA7, the demodulator 108 makes a judgment of whether the right guard bar RGB (refer to FIG. 5C) is detected or not. In this case, the result of the judgment is No.

At step SA10, the demodulator makes a judgment of whether the center bar CB (refer to FIG. 5C) is detected or not. In this case, the result of the judgment is Yes. At step SA11, due to the block reading (refer to FIG. 5C), a block demodulation to carry out character demodulation is performed based on reading data of characters.

Figure 10:
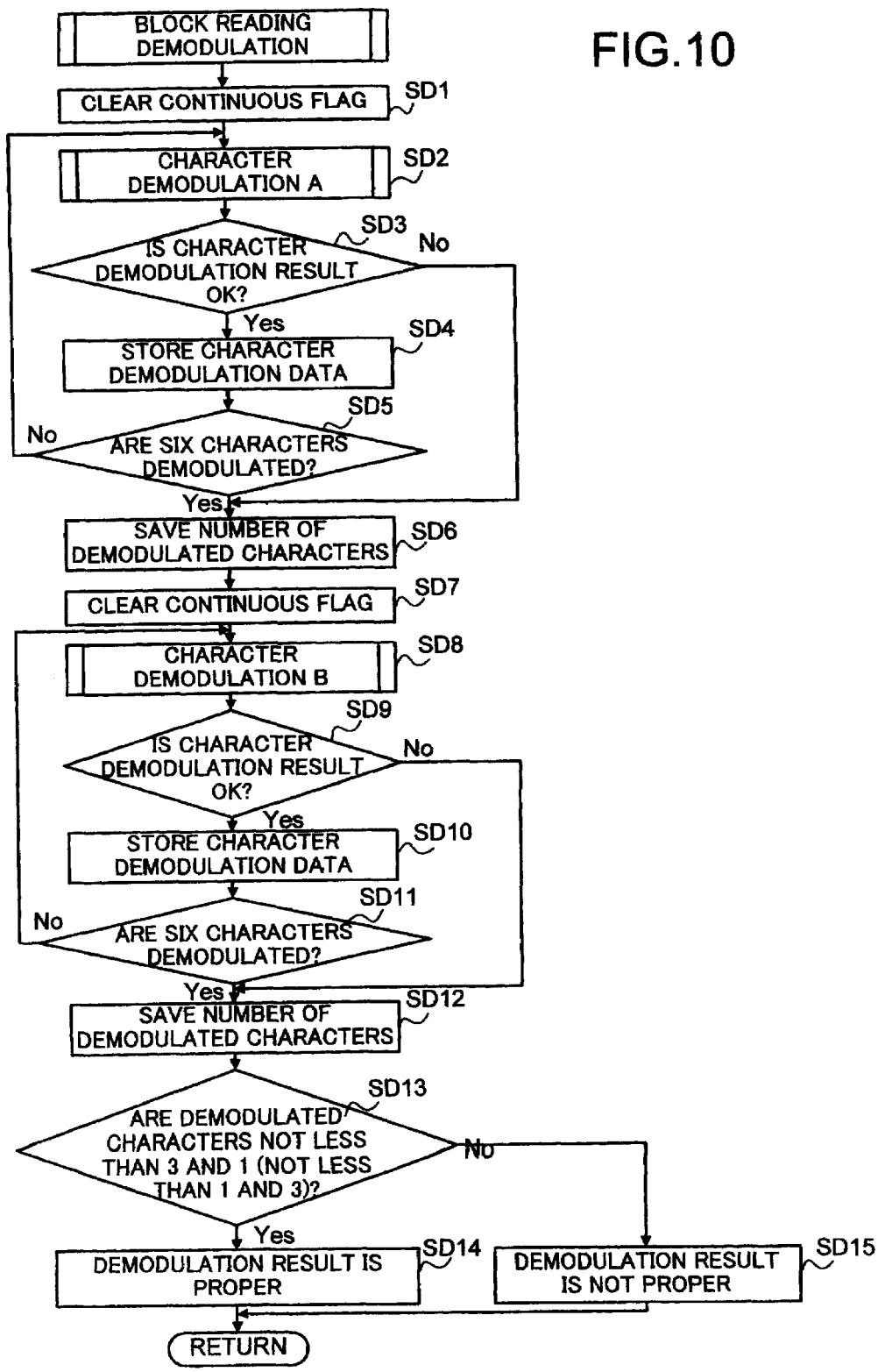
FIG. 10 is a flow chart of block-reading demodulation shown in FIG. 6.

Concretely, at step SD1 shown in FIG. 10, the demodulator 108 clears a continuous flag. At step SD2, the demodulator 108 performs character demodulation A (refer to FIG. 11) to demodulate the first character in the left data block (six characters) between the center bar CB and the left guard bar LGB shown in FIG. 5C.

At step SD3, the demodulator 108 makes a judgment of whether the character demodulation result in the character demodulation A for the first character is proper. In this case, the result of the judgment is Yes. If the result of the judgment at SD3 is No, then step SD6 is executed. At step SD4, the demodulator stores the character demodulation data in the memory 112.

At step SD5, the demodulator 108 makes a judgment of whether six characters in the left data block between the center bar CB and the left guard bar LGB shown in FIG. 5C are demodulated or not. In this case, the result of the judgment is No and steps SD2 to SD5 are re-executed.

If the result of the judgment at step SD5 is Yes, at step SD6, the demodulator 108 saves data of the number of demodulated characters (in this case, six characters) in the memory 112. At step SD7, the demodulator 108 clears the continuous flag.

At step SD8, the demodulator 108 performs character demodulation B (refer to FIG. 12) to demodulate the first character in the right data block (six characters) between the center bar CB and the right guard bar RGB shown in FIG. 5C.

At step SD9, the demodulator 108 makes a judgment of whether the character demodulation result in the character demodulation B for the first character is proper. In this case, the result of the judgment is Yes. If the result of the judgment at SD9 is No, step SD12 is executed. At step SD10, the demodulator stores the character demodulation data in the memory 112.

At step SD11, the demodulator 108 makes a judgment of whether six characters in the right data block between the center bar CB and the right guard bar RGB shown in FIG. 5C are demodulated or not. In this case, the result of the judgment is No and steps SD8 to SD11 are re-executed.

At step SD13, the demodulator 108 makes a judgment of whether or not the number of demodulated characters that are saved at step SD6 is not less than three and the number of demodulated characters that are saved at step SD12 is not less than one (or whether or not the number of demodulated characters that are saved at step SD6 is not less than one and the number of demodulated characters that are saved at step SD12 is not less than three).

If the result of the judgment at step SD13 is Yes, at step SD14, the demodulator 108 makes a determination that the demodulation result is proper. Whereas, if the result of the judgment at step SD13 is No, at step SD15, the demodulator 108 makes the demodulation result as not proper.

Referring back to FIG. 6, at step SA12, the demodulator 108 makes a judgment of whether the demodulation was proper (demodulation result OK) in the block reading or not. In this case, the result of the judgment is Yes and steps SA14 onward are executed. If the result of the judgment at step SA12 is No, step SA13 is executed.

Thus, according to the present embodiment, when number of modules that has a one-character composition is judged to be different (six modules or eight modules) than seven modules which is a predetermined number, the character is demodulated by using the demodulation pattern table 410A for six modules, the demodulation pattern table 420A for eight modules, the demodulation pattern table 410B for six modules, and the demodulation pattern table 420B for eight modules which are set in advance according to the number of modules. This enables to improve an accuracy of the bar-code reading.

Moreover, when the number of modules is continuously judged to be different than the predetermined number of modules, the demodulation of a character is not possible. This enables to eliminate a reading result that may have a major defect.

Thus, according to the present invention, when number of modules that form one character is judged to be different than predetermined number, the character is demodulated by using a demodulation pattern table that is set in advance according the number of modules. This has enabled to improve an accuracy of bar-code reading.

Moreover, when the number of modules is continuously judged to be different than the predetermined number of modules, the demodulation of a character is not possible. This has enabled to eliminate a reading result that may have a major defect.

Furthermore, when a demodulation pattern corresponds to a case in which the number of modules is less than the predetermined number and in a case of a pattern that cannot be demodulated from the demodulation pattern table, candidates for a character are provided to user to enable selection of a candidate by the user. Thus, a user support is provided for the bar-code reading.

Moreover, a basic frequency equivalent to a unit module of the bar code is extracted based on a reading signal of the bar code. Module-judgment data is output according to a timing point that is synchronized with the reading signal and the basic frequency and a judgment of number of modules is made based on the module-judgment data. In such a case of making the judgment of number of modules, it is possible to improve the accuracy of bar-code reading.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A bar-code reader comprising:
   a judging unit that judges number of modules corresponding to a character from character data read from a bar-code; and
   a demodulating unit that, if the number of modules judged is different from a predetermined number, demodulates the character by using a single demodulation-pattern table which is selected from a plurality of demodulation-pattern tables according to the number of modules judged, wherein
   the demodulation pattern table is provided for a number that is less than the predetermined number by one, and
   the demodulating unit displays, if the number of modules judged is different from the predetermined number and from a number that is less than one of the predetermined number, predetermined candidates characters on a displaying unit for selection of a character by a user.

2. The bar-code reader according to claim 1, further comprising a module-judgment-data outputting unit that extracts a basic frequency equivalent to a unit module of the bar code based on a signal acquired by reading the bar code and outputs module judgment data according to a point in time that is synchronized with the signal and has the basic frequency, wherein
   the judging unit judges the number of modules based on the module-judgment data.

3. A bar-code reader comprising:
   a judging unit that judges number of modules corresponding to a character from character data read from a bar-code;
   a demodulating unit that, if the number of modules judged is different from a predetermined number, demodulates the character by using a demodulation-pattern table corresponding to the number of modules judged, and
   a consecutive judging unit that judges whether the number of modules judged is judged to be different from the predetermined number consecutively for a plurality of times,
   wherein the demodulating unit displays, if the number of modules judged is different from the predetermined number and from a number that is less than one of the predetermined number, predetermined candidates characters on a displaying unit for selection of a character by a user, and
   wherein the demodulating unit, if the consecutive judging unit judges that the number of modules judged is judged to be different from the predetermined number consecutively for a plurality of times, does not demodulate the character.

4. A method of reading a bar-code, comprising:
   judging a number of modules corresponding to a character from character data read from the bar-code; and
   if the number of modules judged is different from a predetermined number, demodulating the character by using a single demodulation-pattern table which is selected from a plurality of demodulation-pattern tables according to the number of modules judged,
   wherein the demodulation patter is provided for a number that is less than the predetermined number by one, and the demodulating includes displaying, if the number of modules judged is different from the predetermined number and from a number that is less than one of the predetermined number, predetermined candidates characters on a displaying unit of selection of a character by a user.

5. The method according to claim 4, further comprising extracting a basic frequency equivalent to a unit module of the bar code based on a signal acquired by reading the bar code and outputting module judgment data according to a point in time that is synchronized with the signal and has the basic frequency, wherein
the judging includes judging the number of modules based on the module-judgment data.

6. A method of reading a bar-code, comprising:
judging a number of modules corresponding to a character from character data read from the bar-code; and
judging whether the number of modules judged is judged to be different from the predetermined number consecutively for a plurality of times,
wherein if the number of modules judged is different from a predetermined number, demodulating the character by using a demodulation-pattern table corresponding to the number of modules judged,
wherein the demodulation pattern is provided for a number that is less than the predetermined number by one, and
wherein the demodulating does not demodulate the character if the judging judges that the number of modules judged is judged to be different from the predetermined number consecutively for a plurality of times.

* * * * *